US011646806B2

(12) United States Patent
Zhou et al.

(10) Patent No.: US 11,646,806 B2
(45) Date of Patent: May 9, 2023

(54) DETERMINING A TIME GAP FOR CALIBRATION BASED ON A USER EQUIPMENT IDENTIFIER

(71) Applicant: QUALCOMM Incorporated, San Diego, CA (US)

(72) Inventors: Yan Zhou, San Diego, CA (US); Tao Luo, San Diego, CA (US); Masato Kitazoe, Hachiouji (JP); Timo Ville Vintola, San Diego, CA (US); Valentin Alexandru Gheorghiu, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 936 days.

(21) Appl. No.: 16/437,242

(22) Filed: Jun. 11, 2019

(65) Prior Publication Data

US 2019/0386752 A1    Dec. 19, 2019

Related U.S. Application Data

(60) Provisional application No. 62/685,274, filed on Jun. 14, 2018.

(51) Int. Cl.
*H04B 17/12* (2015.01)
*H04W 76/11* (2018.01)
(Continued)

(52) U.S. Cl.
CPC .............. *H04B 17/12* (2015.01); *H04W 8/26* (2013.01); *H04W 52/52* (2013.01);
(Continued)

(58) Field of Classification Search
CPC ........ H04B 17/12; H04W 76/11; H04W 8/26; H04W 52/52; H04W 72/0446; H04W 72/0473
(Continued)

(56) References Cited

U.S. PATENT DOCUMENTS 9,839,026 B2    12/2017  Seo et al.
2006/0199552 A1*  9/2006  Blech .................. H04W 52/245
                                                            455/127.1
(Continued)

FOREIGN PATENT DOCUMENTS

CN    101233654 A    7/2008
CN    105794262 A    7/2016
(Continued)

OTHER PUBLICATIONS

3GPP TSG RAN WG4 Meeting #85, R4-1712882, Reno, USA, Nov. 27-Dec. 1, 2017, "PA calibration gap for FR2", Intel Corporation. (Year: 2017).*

(Continued)

*Primary Examiner* — Chi Tang P Cheng
(74) *Attorney, Agent, or Firm* — Holland & Hart LLP

(57) ABSTRACT

Methods, systems, and devices for wireless communications are described. In some systems, a user equipment (UE) may perform a calibration to improve the accuracy, reliability, or both of signal transmissions. The UE may determine timing for the calibration procedure based on a received identifier for the UE (e.g., a radio network temporary identifier (RNTI), such as a cell RNTI (C-RNTI)). For example, the UE may determine a calibration offset between a reference time and a calibration gap according to an equation using at least the identifier as input. During the calibration gap, the UE may transmit a calibration signal using one or more antenna ports and may calibrate (e.g., adjust power amplification for) the one or more antenna ports based on an estimated actual transmit power for the calibration signal (e.g., received by other antenna ports of the UE or received by another device).

26 Claims, 16 Drawing Sheets

(51) Int. Cl.
  *H04W 8/26* (2009.01)
  *H04W 72/0446* (2023.01)
  *H04W 72/044* (2023.01)
  *H04W 52/52* (2009.01)

(52) U.S. Cl.
  CPC ... *H04W 72/0446* (2013.01); *H04W 72/0473* (2013.01); *H04W 76/11* (2018.02)

(58) Field of Classification Search
  USPC .......................................................... 370/329
  See application file for complete search history.

(56) References Cited

U.S. PATENT DOCUMENTS

| | | | |
|---|---|---|---|
| 2011/0116364 A1* | 5/2011 | Zhang | H04W 74/08 370/216 |
| 2014/0226511 A1 | 8/2014 | Gotman | |
| 2015/0245375 A1* | 8/2015 | Li | H04L 5/0048 370/329 |
| 2016/0021694 A1* | 1/2016 | Pan | H04W 74/002 370/329 |
| 2018/0092048 A1 | 3/2018 | Cheng et al. | |
| 2018/0220458 A1* | 8/2018 | Ouchi | H04L 27/2601 |

FOREIGN PATENT DOCUMENTS

| | | |
|---|---|---|
| CN | 103797736 B | 6/2017 |
| CN | 107534481 A | 1/2018 |
| EP | 3282595 A1 | 2/2018 |

OTHER PUBLICATIONS

3GPP TSG-RAN WG4 Meeting #86, R4-1801799, Athens, Greece, Feb. 26-Mar. 2, 2018, "PA calibration gap parameters for FR2", Intel Corporation. (Year: 2018).*

"3rd Generation Partnership Project; Technical Specification Group Radio Access Network; NR; Radio Resource Control (RRC) protocol specification (Release 15)", 3GPP Standard; Technical Specification; 3GPP TS 38.331, 3rd Generation Partnership Project (3GPP), Mobile Competence Centre, 650, Route Des Lucioles, F-06921, Sophia-Antipolis Cedex, France, vol. RAN WG2, No. V15.1.0, Apr. 2, 2018 (Apr. 2, 2018), pp. 1-268, XP051450735, [retrieved on Apr. 2, 2018] section TCI-State; p. 192-p. 193.

Intel Corporation: "On Uplink Calibration Signal", 3GPP TSG RAN WG1 Meeting NR#3, 3GPP Draft; R1-1716291 On TX Calibration Signal, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017, 2 Pages, XP051339747, Retrieved from the Internet: URL: http://www.3gpp.org/ftp/Meetings_3GPP_SYNC/RAN1/Docs/ [retrieved on Sep. 17, 2017].

Intel Corporation: "PA Calibration Gap Parameters for FR2", 3GPP TSG-RAN WG4 Meeting #86, 3GPP Draft; R4-1801799 PA Calibration Gap FR2, 3rd Generation Partnership Project (3GPP), Mobile Competence Centre; 650, Route Des Lucioles; F-06921 Sophia-Antipolis Cedex; France, vol. RAN WG4, No. Athens, Greece; Feb. 26, 2018-Mar. 2, 2018, Feb. 19, 2018 (Feb. 19, 2018), pp. 1-7, XP051403114, Retrieved from the Internet: URL: http://www.3gpp.org/ftp/tsg%5Fran/WG4%5FRadio/TSGR4%5F86/Docs/ [retrieved on Feb. 19, 2018].

International Search Report and Written Opinion—PCT/US2019/036767—ISA/EPO—dated Sep. 6, 2019.

* cited by examiner

DETERMINING A TIME GAP FOR CALIBRATION BASED ON A USER EQUIPMENT IDENTIFIER

CROSS REFERENCE

The present Application for Patent claims the benefit of U.S. Provisional Patent Application No. 62/685,274 by ZHOU et al., entitled "DETERMINING A TIME GAP FOR POWER AMPLIFIER CALIBRATION," filed Jun. 14, 2018, assigned to the assignee hereof, and expressly incorporated herein.

BACKGROUND

The following relates generally to wireless communications, and more specifically to calibration for a user equipment (UE).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as UEs.

In some wireless communications systems, a UE may calibrate one or more antenna ports in order to transmit reliable signals. The UE needs to determine a calibration gap to utilize for this calibration procedure, where the UE can avoid interference from non-calibration signals during the calibration gap. However, utilizing radio resource control (RRC) messaging to indicate the timing of the calibration gap may introduce significant latency and processing overhead into the calibration procedure.

SUMMARY

The described techniques relate to improved methods, systems, devices, and apparatuses that support determining a calibration gap for transmissions related to wireless communications (e.g., at a user equipment (UE)). Generally, the described techniques provide for determining the calibration gap according to an identifier for the UE (e.g., a radio network temporary identifier (RNTI), such as a cell RNTI (C-RNTI)). The UE may receive the identifier (e.g., from a base station) and may determine timing for the calibration procedure based on the received identifier. For example, the UE may determine a start offset between a reference time (e.g., the start of a frame with a system frame number (SFN) equal to 0) and the calibration gap according to an equation using at least the identifier as input. The calibration gap may have a pre-determined or configurable duration, periodicity, or both. During the calibration gap, the UE may transmit a calibration signal using one or more antenna ports and may calibrate the one or more antenna ports (e.g., calibrate or adjust power amplification for the one or more antenna ports) based on an estimated actual transmit power for the calibration signal (e.g., received by other antenna ports of the UE, or received by another device). The UE may then transmit signals using the one or more antenna ports with transmit powers (e.g., transmission power levels) based on the calibration (e.g., the calibrated or adjusted power amplification).

A method for wireless communications at a UE is described. The method may include receiving, at the UE, an indication of an identifier for the UE, determining resources for a calibration gap based on the identifier, calibrating at least one antenna port of the UE during the calibration gap, and transmitting, by the at least one antenna port, a signal using the calibration.

An apparatus for wireless communications at a UE is described. The apparatus may include a processor, memory in electronic communication with the processor, and instructions stored in the memory. The instructions may be executable by the processor to cause the apparatus to receive, at the UE, an indication of an identifier for the UE, determine resources for a calibration gap based on the identifier, calibrate at least one antenna port of the UE during the determined calibration gap, and transmit, by the at least one antenna port, a signal using the calibration.

Another apparatus for wireless communications at a UE is described. The apparatus may include means for receiving, at the UE, an indication of an identifier for the UE, determining resources for a calibration gap based on the identifier, calibrating at least one antenna port of the UE during the determined calibration gap, and transmitting, by the at least one antenna port, a signal using the calibration.

A non-transitory computer-readable medium storing code for wireless communications at a UE is described. The code may include instructions executable by a processor to receive, at the UE, an indication of an identifier for the UE, determine resources for a calibration gap based on the identifier, calibrate at least one antenna port of the UE during the determined calibration gap, and transmit, by the at least one antenna port, a signal using the calibration.

In some examples of the method, apparatuses, and non-transitory computer-readable medium described herein, the calibration gap may include a power amplifier (PA) calibration gap, and calibrating the at least one antenna port of the UE may involve calibrating power amplification for the at least one antenna port.

In some examples of the method, apparatuses, and non-transitory computer-readable medium described herein, the identifier may include an RNTI for the UE. In some examples of the method, apparatuses, and non-transitory computer-readable medium described herein, the RNTI may be an example of a C-RNTI.

In some examples of the method, apparatuses, and non-transitory computer-readable medium described herein, determining the resources for the calibration gap may include operations, features, means, or instructions for determining a start offset for the calibration gap, where the start offset indicates an amount of time between a reference time and a start of the calibration gap. In some examples of the method, apparatuses, and non-transitory computer-readable medium described herein, the reference time may be a start time of a frame with an SFN of zero.

In some examples of the method, apparatuses, and non-transitory computer-readable medium described herein, the calibration gap may be defined by one or more of an SFN, a subframe index (SFI), or a symbol location.

In some examples of the method, apparatuses, and non-transitory computer-readable medium described herein, calibrating the at least one antenna port may include operations, features, means, or instructions for transmitting, by the at least one antenna port, a calibration signal during the calibration gap.

In some examples of the method, apparatuses, and non-transitory computer-readable medium described herein, calibrating the at least one antenna port further may include operations, features, means, or instructions for receiving, by at least one other antenna port of the UE, the calibration signal, identifying a receive power of the calibration signal received by the at least one other antenna port, estimating an actual transmit power based on the identified receive power, and adjusting the calibration for the at least one antenna port based on the estimated actual transmit power.

In some examples of the method, apparatuses, and non-transitory computer-readable medium described herein, calibrating the at least one antenna port further may include operations, features, means, or instructions for receiving, from another device, an indication of an estimated actual transmit power for the calibration signal and adjusting the calibration for the at least one antenna port based on the estimated actual transmit power.

In some examples of the method, apparatuses, and non-transitory computer-readable medium described herein, the calibration gap may include either a total calibration gap or a partial calibration gap. In some examples of the method, apparatuses, and non-transitory computer-readable medium described herein, where the calibration gap is an example of a total calibration gap, the method, apparatuses, and non-transitory computer-readable medium may further include operations, features, means, or instructions for refraining from transmitting or receiving a non-calibration signal using any other antenna port of the UE during the calibration gap. In other examples of the method, apparatuses, and non-transitory computer-readable medium described herein, where the calibration gap is an example of a partial calibration gap, the method, apparatuses, and non-transitory computer-readable medium may further include operations, features, means, or instructions for transmitting or receiving a non-calibration signal using at least one other antenna port of the UE during the calibration gap. In some examples of the method, apparatuses, and non-transitory computer-readable medium described herein, a function for determining the total calibration gap may be different from a function for determining the partial calibration gap.

Some examples of the method, apparatuses, and non-transitory computer-readable medium described herein may further include operations, features, means, or instructions for determining an additional calibration gap based on the identifier, identifying a collision between the additional calibration gap and a scheduled signal, and refraining from calibrating the at least one antenna port during the additional calibration gap based on the scheduled signal. In some examples of the method, apparatuses, and non-transitory computer-readable medium described herein, the scheduled signal may include a synchronization signal block (SSB) signal.

Some examples of the method, apparatuses, and non-transitory computer-readable medium described herein may further include operations, features, means, or instructions for determining one or more of a duration for the calibration gap or a periodicity for calibration gaps and transmitting, to a base station, an indication of the determined one or more of the duration for the calibration gap or the periodicity for the calibration gaps.

In some examples of the method, apparatuses, and non-transitory computer-readable medium described herein, the calibration gap may be determined further based on one or more of a duration of the calibration gap or a periodicity of calibration gaps. In some examples of the method, apparatuses, and non-transitory computer-readable medium described herein, one or more of the duration of the calibration gap or the periodicity of the calibration gaps may be set to pre-configured values.

In some examples of the method, apparatuses, and non-transitory computer-readable medium described herein, the identifier may include an international mobile subscriber identity (IMSI) for the UE.

A method for wireless communications at a receiving device is described. The method may include determining a calibration gap for a UE based on an identifier for the UE, receiving a calibration signal from at least one antenna port of the UE during the determined calibration gap, estimating an actual transmit power for the at least one antenna port of the UE based on a receive power of the calibration signal, and indicating, to the UE, the estimated actual transmit power.

An apparatus for wireless communications at a receiving device is described. The apparatus may include a processor, memory in electronic communication with the processor, and instructions stored in the memory. The instructions may be executable by the processor to cause the apparatus to determine a calibration gap for a UE based on an identifier for the UE, receive a calibration signal from at least one antenna port of the UE during the calibration gap, estimate an actual transmit power for the at least one antenna port of the UE based on a receive power of the calibration signal, and indicate, to the UE, the estimated actual transmit power.

Another apparatus for wireless communications at a receiving device is described. The apparatus may include means for determining a calibration gap for a UE based on an identifier for the UE, receiving a calibration signal from at least one antenna port of the UE during the determined calibration gap, estimating an actual transmit power for the at least one antenna port of the UE based on a receive power of the calibration signal, and indicating, to the UE, the estimated actual transmit power.

A non-transitory computer-readable medium storing code for wireless communications at a receiving device is described. The code may include instructions executable by a processor to determine a calibration gap for a UE based on an identifier for the UE, receive a calibration signal from at least one antenna port of the UE during the determined calibration gap, estimate an actual transmit power for the at least one antenna port of the UE based on a receive power of the calibration signal, and indicate, to the UE, the estimated actual transmit power.

In some examples of the method, apparatuses, and non-transitory computer-readable medium described herein, the calibration gap may include a PA calibration gap.

In some examples of the method, apparatuses, and non-transitory computer-readable medium described herein, the identifier may include an RNTI for the UE. In some examples of the method, apparatuses, and non-transitory computer-readable medium described herein, the RNTI may be an example of a C-RNTI.

In some examples of the method, apparatuses, and non-transitory computer-readable medium described herein, indicating the estimated actual transmit power may include operations, features, means, or instructions for transmitting, to the UE, an indication of the estimated actual transmit power.

Some examples of the method, apparatuses, and non-transitory computer-readable medium described herein may further include operations, features, means, or instructions for receiving, from the at least one antenna port of the UE, a signal calibrated based on the estimated actual transmit power.

Some examples of the method, apparatuses, and non-transitory computer-readable medium described herein may further include operations, features, means, or instructions for transmitting, to the UE, the identifier for the UE.

In some examples of the method, apparatuses, and non-transitory computer-readable medium described herein, the receiving device may include the UE, a different UE, or a base station.

DETAILED DESCRIPTION

Figure 1:
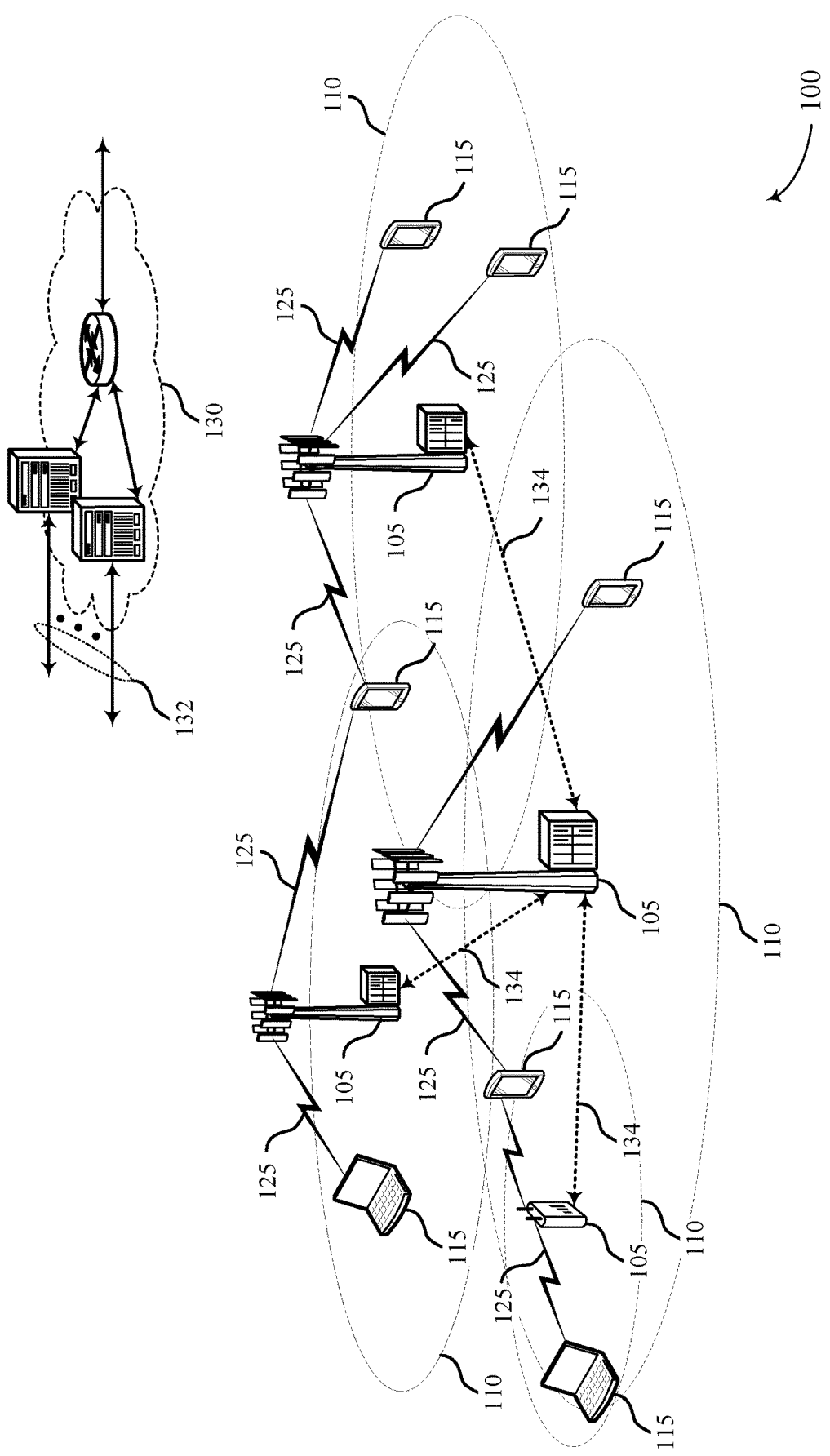
FIGS. 1 and 2 illustrate examples of wireless communications systems that support determining a time gap for calibration in accordance with aspects of the present disclosure.

In some wireless communications systems, user equipment (UEs) may perform calibration to adjust antenna port transmissions (e.g., power amplification for antenna port transmissions). These adjustments may improve the accuracy of the expected transmissions (e.g., expected transmit power values) for the antenna ports. A UE may determine timing for the calibration operations based on an identifier for the UE. For example, a base station may transmit an identifier of the UE to the UE. This identifier may be, for example, a radio network temporary identifier (RNTI), such as a cell RNTI (C-RNTI), or an international mobile subscriber identity (IMSI). The UE may use the received identifier and a determination rule, function, equation, or lookup table to determine a calibration gap. This gap may be defined by one or more values, such as a system frame number (SFN), a subframe index (SFI), and/or a symbol location. The UE may determine the calibration gap according to a time offset and a reference time. For example, the time offset may define a length of time or number of symbols between the reference time (e.g., the start of a frame with SFN=0) and the start of the calibration gap. In some cases, the UE may determine the length of the calibration gap based on a pre-configured or semi-dynamic calibration duration value. Additionally or alternatively, the UE may determine multiple calibration gaps according to a pre-configured or semi-dynamic calibration periodicity.

During the calibration gap, the UE may transmit a calibration signal using at least one antenna port. This calibration signal may be received by a receiving device, such as a base station, another UE, or the same UE (e.g., at a different antenna port). The receiving device may identify a receive power for the calibration signal and may estimate an actual transmit power based on the receive power. The receiving device may then indicate this estimated actual transmit power to the UE. The UE may adjust the calibration for the at least one antenna port (e.g., adjust the power amplification for the at least one antenna port) based on this estimated actual transmit power (e.g., based on a comparison of the estimated actual transmit power to an expected transmit power used for the calibration signal transmission). The UE may then use this adjusted power amplification when transmitting signals using the at least one antenna port.

In some cases, the determined calibration gap may be, for example, a total gap or a partial gap. In some examples, the UE may not transmit or receive any non-calibration signals during a total gap. In some examples, the UE may transmit or receive non-calibration signals using antenna ports not involved in the calibration process during a partial gap. UEs may implement total gaps, partial gaps, or both for calibration gaps. In some examples, a UE may utilize different determination rules, functions, equations, or lookup tables for total gaps and partial gaps. The calibration gap may be an example of a power amplifier (PA) calibration gap for power amplification configuration.

Aspects of the disclosure are initially described in the context of wireless communications systems. Additional aspects of the disclosure are described with respect to a UE calibration process and a process flow. Aspects of the disclosure are further illustrated by and described with reference to apparatus diagrams, system diagrams, and flowcharts that relate to determining a time gap for calibration.

FIG. 1 illustrates an example of a wireless communications system 100 that supports determining a time gap for calibration (which may be referred to herein as a calibration gap) in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be, for example, an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be, for example, a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, wireless communications system 100 may support determining a calibration gap based on an identifier for a UE 115. For example, a base station 105 may transmit an identifier of the UE 115 on the downlink to the UE 115. This identifier may be, for example, an RNTI, such as a C-RNTI, or an IMSI. The UE 115 may use the received identifier and a determination rule, function, equation, or lookup table to determine a time gap for calibration. This calibration gap may be defined by one or more values, such as an SFN, an SFI, and/or a symbol location. The UE 115 may determine the resources in time (e.g., the symbols, slots, subframes, etc.) of a calibration gap according to a time offset (e.g., a calibration offset) and a reference time. For example, the time offset may define a length of time or number of symbols between the reference time (e.g., the start of a frame with SFN=0) and the start of the calibration gap. In some cases, the UE 115 may determine the length of the calibration gap based on a pre-configured or semi-dynamic calibration duration value. Additionally or alternatively, the UE 115 may determine multiple calibration gaps according to a pre-configured or semi-dynamic calibration periodicity.

During the calibration gap, the UE 115 may transmit a calibration signal using at least one antenna port. This calibration signal may be received by a receiving device, such as a base station 105, another UE 115, or the same UE 115 (e.g., at different antenna ports). The receiving device may identify a receive power for the calibration signal and may estimate an actual transmit power based on the receive power. The receiving device may then indicate this estimated actual transmit power to the UE 115. The UE 115 may adjust the calibration for the at least one antenna port (e.g., adjust the power amplification for the at least one antenna port) based on this estimated actual transmit power (e.g., based on a comparison of the estimated actual transmit power to an expected transmit power used for the calibration signal transmission). The UE 115 may then use the adjusted calibration when transmitting signals using the at least one antenna port.

In some cases, the determined calibration gap may be, for example, a total gap or a partial gap. The UE 115 may not transmit or receive any non-calibration signals during a calibration total gap, but may transmit or receive non-calibration signals using antenna ports not involved in the calibration process during a calibration partial gap. UEs 115 may implement total gaps, partial gaps, or both for calibration gaps. In some examples, a UE 115 may utilize different determination rules, functions, equations, or lookup tables for total gaps and partial gaps.

Figure 2:
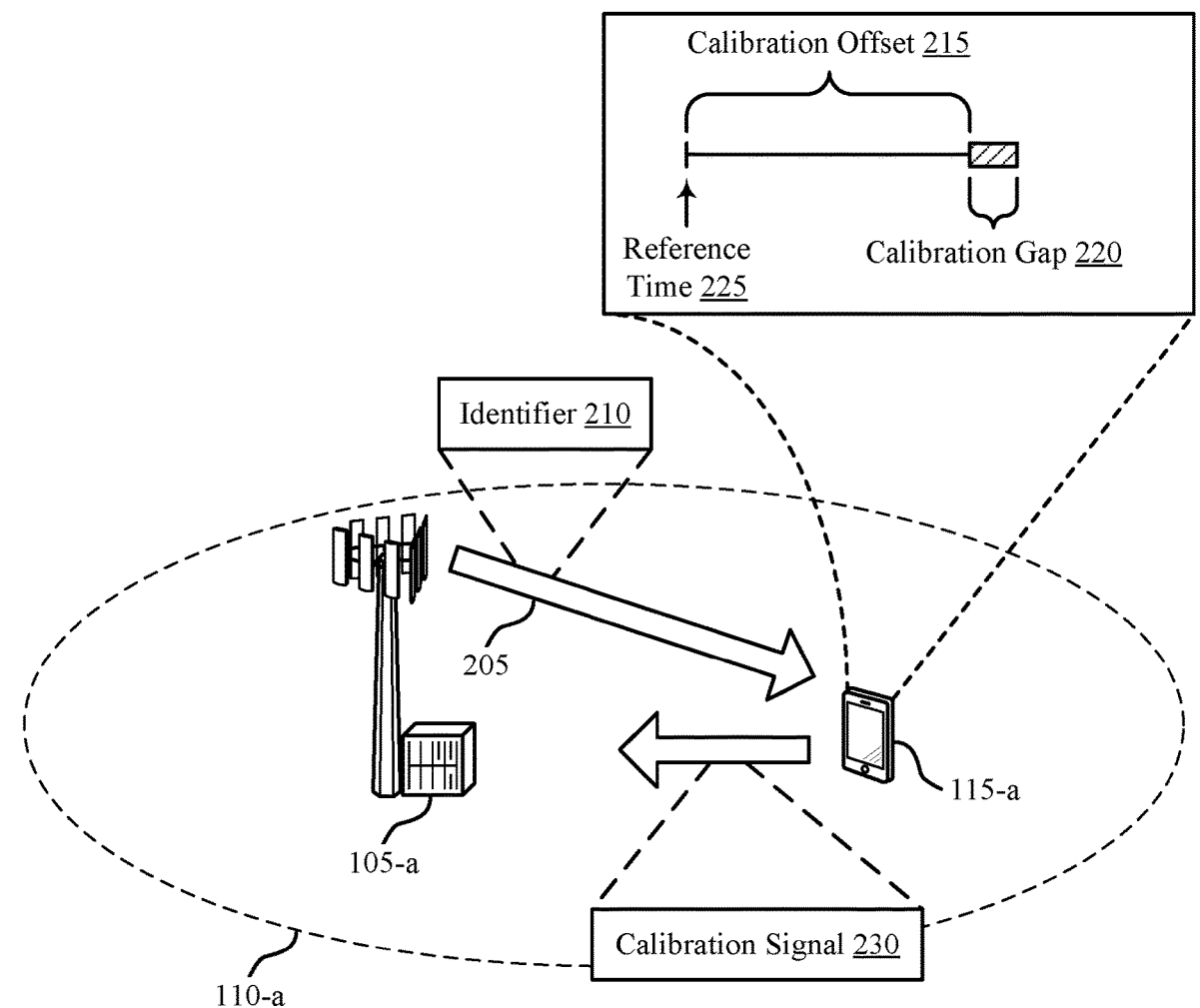

FIG. 2 illustrates an example of a wireless communications system 200 that supports determining a time gap for calibration (e.g., a calibration gap) in accordance with aspects of the present disclosure. The wireless communications system 200 may include base station 105-a and UE 115-a, which may be examples of the corresponding devices described with reference to FIG. 1. Base station 105-a may provide network coverage for geographic coverage area 110-a (e.g., as discussed above with respect to FIG. 1). The wireless communications system 200 may support UE 115-a determining a calibration gap 220 based on an identifier 210 for UE 115-a. UE 115-a may utilize this determined calibration gap 220 to perform calibration (e.g., UE 115-a may perform calibration during this calibration gap 220). Using the identifier 210 (e.g., an RNTI, an IMSI, or both) may allow UE 115-a to determine the calibration timing without incurring significant configuration latency (e.g., as compared to determining the calibration timing based on information in a radio resource control (RRC) message). Additionally, using an identifier 210, rather than an RRC message, may reduce the overhead of RRC messaging over a channel (e.g., as the RRC messages may not include explicit indications of resources for calibration gaps 220). This may improve the efficiency of the calibration process. Performing calibration may support UE 115-a determining accurate transmit power values or readings (e.g., in a millimeter wave (mmW) system).

For example, one or more determination rules, functions, equations, or lookup tables may be defined for UEs 115, where the rules, functions, equations, or tables use a UE identifier 210 as input in order to determine a corresponding time gap value. The rules, functions, equations, or tables may be pre-configured at each UE 115, each base station 105, or both. The rules, functions, equations, or tables may be standard across all of the devices within the wireless communications system 200, or standard across a subset of the devices. In some cases, the identifier 210 for the UE may be an RNTI or an IMSI. For example, UE 115-a may use a C-RNTI, a temporary C-RNTI, a semi persistent scheduling C-RNTI (SPS C-RNTI), or any other type of RNTI, IMSI, or UE or cell-specific identifier assigned to the UE 115-a for determining the calibration offset 215 or calibration gap 220. Base station 105-a may transmit this identifier 210 to UE 115-a on the downlink 205. UE 115-a may receive the identifier 210 and may determine the calibration offset 215 or calibration gap 220 using the identifier 210. In some cases, UE 115-a may determine the calibration offset 215 or calibration gap 220 using additional inputs to the identifier 210, such as a duration of a calibration gap 220, a calibration gap 220 periodicity, other UE or cell-specific identifiers, or any other value relevant to calibration timing.

The calibration offset 215 or gap 220 may be specified by an SFN, an SFI within a frame, a symbol location within a subframe, or some combination of these. In one specific example, the calibration offset 215 or gap 220 may be specified by three values: the SFN, the SFI within the frame specified by the SNF, and the symbol location within the subframe specified by the SFI. In a second specific example, the calibration offset 215 may be specified by a single value indicating a number of symbols after a reference time 225 (e.g., a reference symbol). For example, UE 115-a may receive the identifier 210, and may input at least the identifier into a rule, function, equation, lookup table, or some similar mechanism, where the rule, function, equation, lookup table, or similar mechanism outputs an indication of a calibration offset 215. In this way, UE 115-a may derive the timing information of the calibration gap as it relates to SFNs, SFIs, and/or symbols. The calibration offset 215 may define an amount of time (e.g., in milliseconds (ms), in numbers of frames, subframes, symbols, etc.) between a reference time 225 and a start of a calibration gap 220. This amount of time may be referred to as a start offset. In some cases, the system may support approximately 65,000 possible start offsets for calibration gaps 220. The reference time 225 for this start offset may be the start of a frame with SFN=0. That is, the reference time 225 may correspond to symbol 0 in a subframe with SFI 0 of a frame with SFN 0. Alternatively, the calibration gap 220 determined based on the identifier 210 may specify a definite time (e.g., a specific start frame/time with a specific stop frame/time, a specific duration, etc.) for the calibration gap 220, as opposed to a time relative to a reference time 225 (e.g., start and stop frames/times relative to reference time 225).

Once UE 115-a derives the calibration gap 220 based on the identifier 210, UE 115-a may identify one or more additional calibration gaps 220 corresponding to the calibration gap 220. In some cases, UE 115-a may be pre-configured with a calibration gap duration, a calibration gap periodicity, or both (e.g., where these values may be the same across all or a set of UEs 115). Alternatively, UE 115-a may dynamically or semi-dynamically configure the calibration gap duration, the calibration gap periodicity, or both (e.g., based on channel conditions, scheduled signals, etc.). In these cases, UE 115-a may transmit an indication of the configured values to base station 105-a on the uplink. Based on the calibration gap duration and the calibration gap periodicity, UE 115-a may determine the time span for the calibration gap 220, as well as additional periodic calibration gaps 220 associated with the calibration gap 220 at the end of the calibration offset 215. UE 115-a may perform calibration during the time span of one or more of these calibration gaps 220. That is, UE 115-a may use the resources (e.g., time resources) for the calibration gap 220 to perform antenna calibration processes.

To perform calibration, UE 115-a may transmit a calibration signal 230 using at least one antenna port. UE 115-a may transmit the calibration signal 230 using a specific expected transmit power. In some cases, UE 115-a may transmit the calibration signal 230 in any direction. For example, UE 115-a may transmit the calibration signal 230 on the uplink to base station 105-a, in a direction associated with another receiving device (e.g., another UE 115, an IoT device, etc.), or in a direction to be received by one or more different antenna ports of the same UE 115-a. This calibration signal 230 may be received by a receiving device, and the receiving device may identify (e.g., measure) a receive power associated with the received calibration signal 230. The receiving device may then estimate an actual transmit power based on this measured receive power (e.g., using an actual transmit power equation, formula, or lookup table) and may indicate the estimated actual transmit power to UE 115-a. For example, if the receiving device is a different device than UE 115-a (e.g., base station 105-a, or another base station 105, UE 115, or other device), the receiving device may transmit an indication of the estimated actual transmit power to UE 115-a. This transmission may occur during or after the calibration gap 220. If the receiving device is UE 115-a (e.g., if UE 115-a transmits the calibration signal 230 with one or more first antenna ports and receives the calibration signal 230 with one or more second antenna ports which may be different than the first antenna ports), UE 115-a may estimate the actual transmit power itself and may use this estimate for power calibration. UE 115-a may use this estimated actual transmit power to adjust the calibration for the antenna port(s) (e.g., adjust the power amplification for the antenna port(s)) transmitting the calibration signal 230. For example, UE 115-a may compare the estimated actual transmit power to the expected transmit power used for the calibration signal 230 transmission and may adjust the configuration based on the difference between the actual and expected transmit powers (e.g., transmission power levels). UE 115-a may use the adjusted calibration (e.g., the adjusted power amplification in a PA calibration procedure) for the at least one antenna port to determine transmit power when transmitting signals.

In some cases, UE 115-a may repeat this process for multiple antenna ports. In a first example, UE 115-a may perform calibration for a single antenna port per calibration gap 220, and may utilize multiple calibration gaps 220—corresponding to the determined calibration gap 220 and a gap periodicity—to calibrate multiple antenna ports. In a second example, UE 115-a may perform calibration for each antenna port in a single calibration gap 220. In a third example, UE 115-a may perform calibration for one or more antenna ports in one or more calibration gaps 220 (e.g., based on the duration of the calibration gaps 220, based on the number of antenna ports to calibrate, based on channel conditions, etc.). In any of the above examples, UE 115-a may calibrate settings for each antenna port individually for improved transmission.

The calibration gap 220 may be, for example, a total gap or a partial gap. The total gap and partial gap may respectively correspond to total gap timing information for a calibration gap 220 and partial gap timing information for a calibration gap 220. Total gap timing information may correspond to a calibration gap 220 where UE 115-a may not transmit or receive any non-calibration signals (e.g., scheduled signals) during the duration of the calibration gap 220 (e.g., on the uplink or downlink 205). Partial gap timing information may correspond to a calibration gap 220 where UE 115-a may transmit or receive non-calibration signals (e.g., scheduled signals) using one or more antenna ports during the duration of the calibration gap 220 (e.g., on the uplink or downlink 205). In some cases, these antenna ports may be a subset of antenna ports not utilized for the calibration procedure during the calibration gap 220 (e.g., either transmitting or receiving a calibration signal 230). In a specific example, UE 115-a may be scheduled for a two layer physical uplink shared channel (PUSCH) transmission. If implementing a partial gap, UE 115-a may transmit a PUSCH signal using one antenna port and may use another antenna port for calibration purposes. For example, UE 115-a may transmit a PUSCH signal using one antenna port, may transmit a calibration signal 230 using a second antenna port, and may receive the calibration signal 230 using a third antenna port. It is to be understood that any number of antenna ports may perform each of these functions. In some cases, UE 115-a may include different rules, functions, equations, or tables for determining total gaps and partial gaps based on an identifier 210. In other cases, UE 115-a may include the same rules, functions, equations, or tables for determining total gaps and partial gaps.

In some cases, the determined calibration gap 220 (e.g., corresponding to the determined calibration offset 215) may collide with a specific signal. For example, UE 115-a may be scheduled to transmit or receive a non-calibration signal during a time period overlapping with at least a portion of the calibration gap 220. In these cases, UE 115-a may not use the calibration gap 220 for calibration, and instead may use the time period overlapping with the calibration gap 220 to transmit or receive the scheduled non-calibration signal. For example, if the non-calibration signal has a priority higher than a certain priority threshold, UE 115-a may opt not to use the calibration gap 220 for calibration. In an example, the non-calibration signal may be a synchronization signal block (SSB) signal (e.g., transmitted by base station 105-a). If a non-calibration signal collides and takes priority over calibration, UE 115-a may utilize a later calibration gap 220 for calibration. UE 115-a may determine the later calibration gap(s) 220 based on the determined calibration offset 215 or gap 220 and a calibration gap periodicity.

Figure 3:
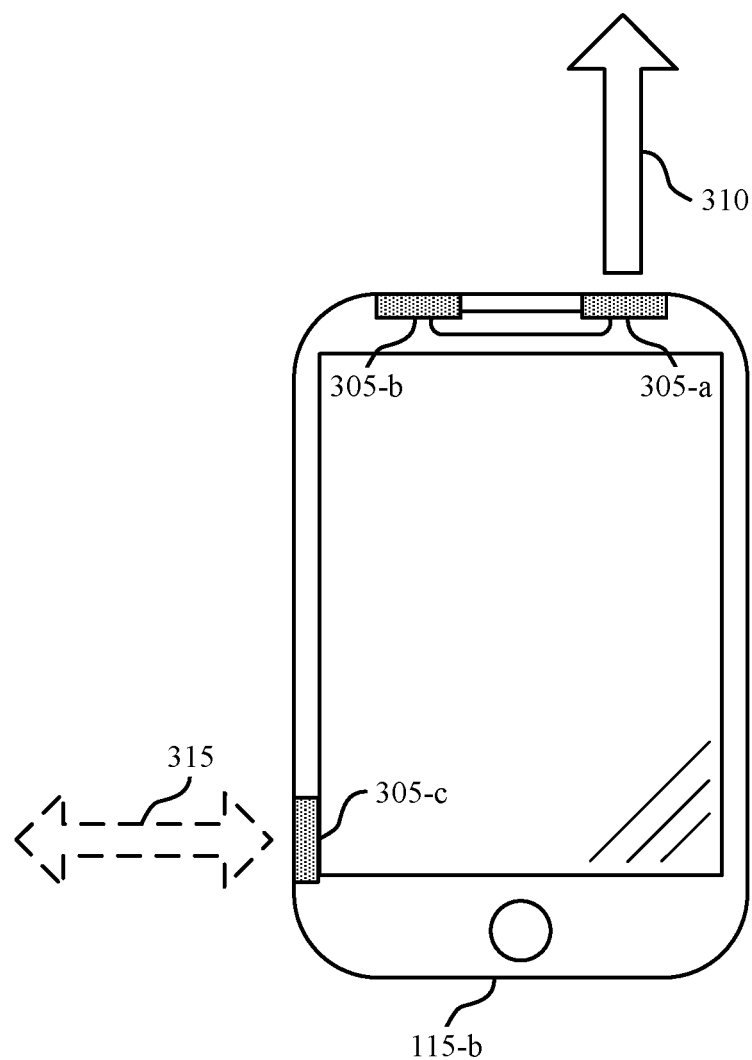
FIG. 3 illustrates an example of a user equipment (UE) calibration process that supports determining a time gap for calibration in accordance with aspects of the present disclosure.

FIG. 3 illustrates an example of a UE calibration process 300 that supports determining a time gap for calibration in accordance with aspects of the present disclosure. The UE calibration process 300 may include UE 115-b, which may be an example of a UE 115 as described with reference to FIGS. 1 and 2. UE 115-b may have previously connected to and synchronized with a network. UE 115-b may receive or otherwise identify an identifier for UE 115-b, such as an RNTI. UE 115-b may utilize this RNTI to determine timing for a calibration procedure for one or more antenna ports (e.g., one or more of antenna ports 305-a through 305-c).

For example, UE 115-b may input the RNTI value into an equation stored in memory of UE 115-b and may derive a calibration gap or an initial calibration gap timestamp for performing calibration based on the equation. UE 115-b may then transmit a calibration signal 310 by at least one antenna port (e.g., at least one of antenna ports 305-a through 305-c) during an identified calibration gap. This calibration gap may be identified based on a derived calibration timing gap, a reference time, a derived initial calibration gap timestamp, a calibration gap periodicity, a calibration gap duration, or any combination of these. In some cases, the calibration gap may be an example of a PA calibration gap specifically configured for power amplification calibration. In other cases, the calibration gap may be used for any number of calibration procedures (e.g., antenna port calibration procedures). As illustrated, UE 115-*b* may transmit a calibration signal 310 using antenna port 305-*a* in order to perform calibration for antenna port 305-*a*. This may allow UE 115-*b* to use antenna port 305-*a* to determine more accurate transmit powers (e.g., transmission power levels) for using antenna port 305-*a* for transmission.

In some cases, a device other than UE 115-*b* may receive the calibration signal 310 and may transmit an indication of an estimated actual transmit power to UE 115-*b* in response. UE 115-*b* may receive the transmission indicating the estimated actual transmit power at any antenna port (e.g., any of antenna ports 305-*a* through 305-*c*) and may calibrate power amplification for antenna port 305-*a* based on the received estimated actual transmit power. In other cases, UE 115-*b* may receive the calibration signal 310 at a different antenna port. For example, if antenna port 305-*a* transmits the calibration signal 310, antenna port 305-*b* may receive the calibration signal 310 (e.g., during the calibration gap). In such an example case, UE 115-*b* may measure a receive power for the calibration signal 310, estimate an actual transmit power for the transmission of the calibration signal 310, and may utilize this estimated actual transmit power to modify the power amplification at antenna port 305-*a*.

In some examples, the calibration procedure may be based on a partial calibration gap. In these examples, antenna ports not involved in the calibration procedure (e.g., where antenna ports 305-*a* and 305-*b* may be involved in a calibration procedure and antenna port 305-*c* may not be) may communicate during the calibration gap (e.g., during the calibration procedure). For example, antenna port 305-*c* may transmit or receive non-calibration signals 315 (e.g., scheduled signals) during a partial calibration gap. In this way, during a partial calibration gap, UE 115-*b* may support using a subset of antenna ports 305-*a* through 305-*c* for calibration processes and a different subset of antenna ports 305-*a* through 305-*c* for non-calibration processes to efficiently utilize the set of antenna ports 305-*a* through 305-*c*. In other examples, the calibration procedure may be based on a total calibration gap, and no antenna ports 305 for UE 115-*b* may communicate using non-calibration signals 315 during the calibration procedure (e.g., during the calibration gap).

Figure 4:
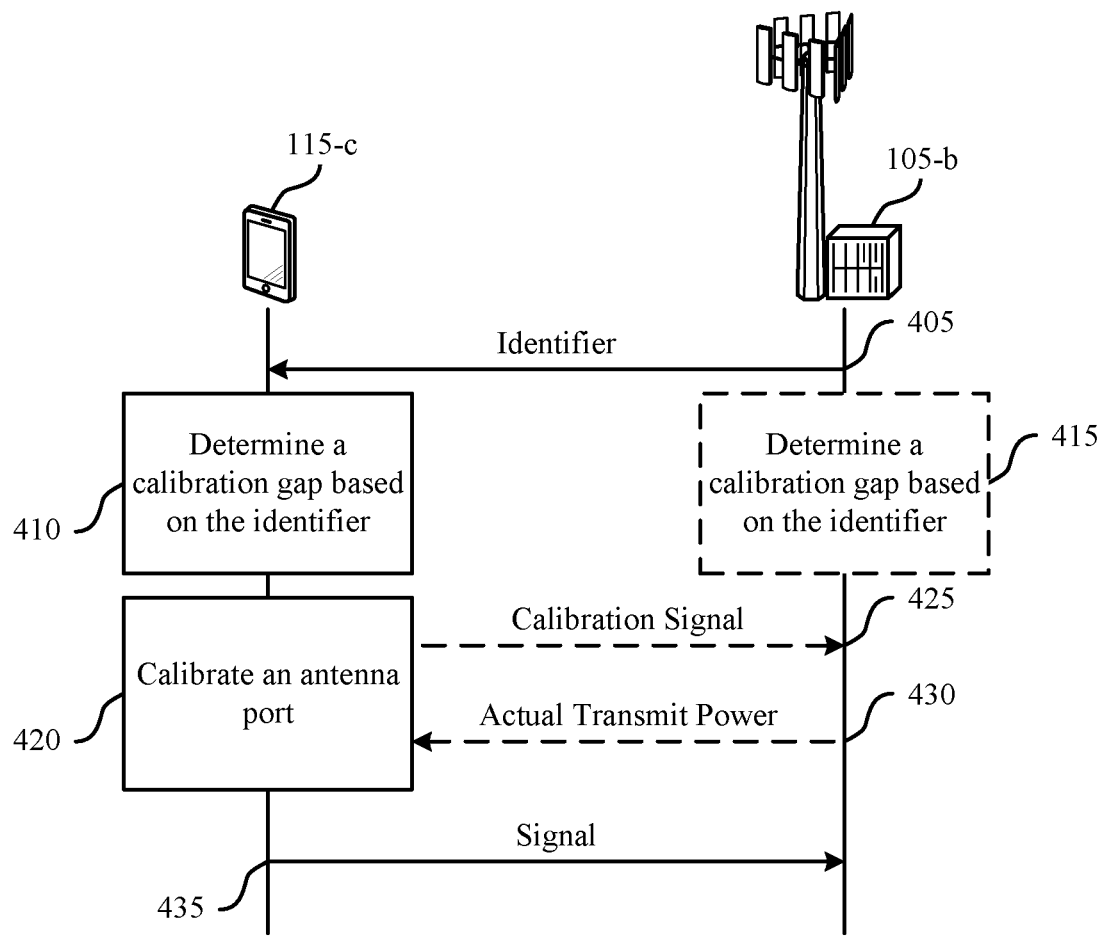
FIG. 4 illustrates an example of a process flow that supports determining a time gap for calibration in accordance with aspects of the present disclosure.

FIG. 4 illustrates an example of a process flow 400 that supports determining a time gap for calibration in accordance with aspects of the present disclosure. Process flow 400 may include UE 115-*c* and base station 105-*b*, which may be examples of the corresponding devices described with reference to FIGS. 1 through 3. Alternative examples of the following may be implemented, where some steps are performed in a different order than described or not performed at all. In some cases, steps may include additional features not mentioned below, or further steps may be added.

At 405, base station 105-*b* may transmit an indication of an identifier to UE 115-*c*. This identifier may be, for example, an RNTI (e.g., a C-RNTI) or an IMSI.

At 410, UE 115-*c* may determine a calibration gap (e.g., resources for a calibration gap) based on the identifier. For example, UE 115-*c* may determine a start offset for a calibration gap, where the start offset indicates an amount of time between a reference time (e.g., the start time of a frame with an SFN=0) and the start of the calibration gap. In some cases, determining the calibration gap may be based on a pre-configured equation or table stored in memory of UE 115-*c*, where the identifier—and, in some cases, other additional variables—is used as input. In some cases, at 415, base station 105-*b* may also determine the calibration gap for UE 115-*c* based on the identifier.

At 420, UE 115-*c* may calibrate at least one antenna port of UE 115-*c* (e.g., calibrate power amplification for at least one antenna port of UE 115-*c*) during the determined calibration gap (e.g., using the determined resources for the calibration gap). The calibration gap may have a start time corresponding with the end time of a calibration offset (e.g., as illustrated in FIG. 2 with reference to the calibration offset 215 and the calibration gap 220), or the calibration gap may have start and stop times corresponding to a periodic schedule. Calibrating the at least one antenna port may include transmitting a calibration signal from the at least one antenna port (e.g., during the calibration gap). In a first example, UE 115-*c* may receive the calibration signal itself (e.g., using one or more antenna ports other than the at least one antenna port used for transmitting the calibration signal). UE 115-*c* may then estimate an actual transmit power for the at least one antenna port (i.e., the transmitting antenna port(s)) based on a measured receive power of the calibration signal at the receiving antenna port(s). UE 115-*c* may adjust the calibration for the at least one antenna port (e.g., adjust the power amplification for the at least one antenna port) based on the estimated actual transmit power.

In a second example (e.g., at 425), this calibration signal may be transmitted to and received at a receiving device (e.g., base station 105-*b*, another UE 115, etc.). The receiving device may receive the calibration signal from the at least one antenna port of UE 115-*c* during the calibration gap and may estimate an actual transmit power for the at least one antenna port of UE 115-*c* based on a measured receive power of the calibration signal. The receiving device may indicate this estimated actual transmit power to UE 115-*c*, and UE 115-*c* may adjust the calibration for the at least one antenna port (e.g., adjust the power amplification for the at least one antenna port) based on the estimated actual transmit power. In an example where base station 105-*b* is the receiving device, base station 105-*b* may transmit the estimated actual transmit power to UE 115-*c* (e.g., at 430).

At 435, UE 115-*c* may transmit, by the at least one antenna port (e.g., and to base station 105-*b*), a signal using the calibration (e.g., the calibrated power amplification).

Figure 5:
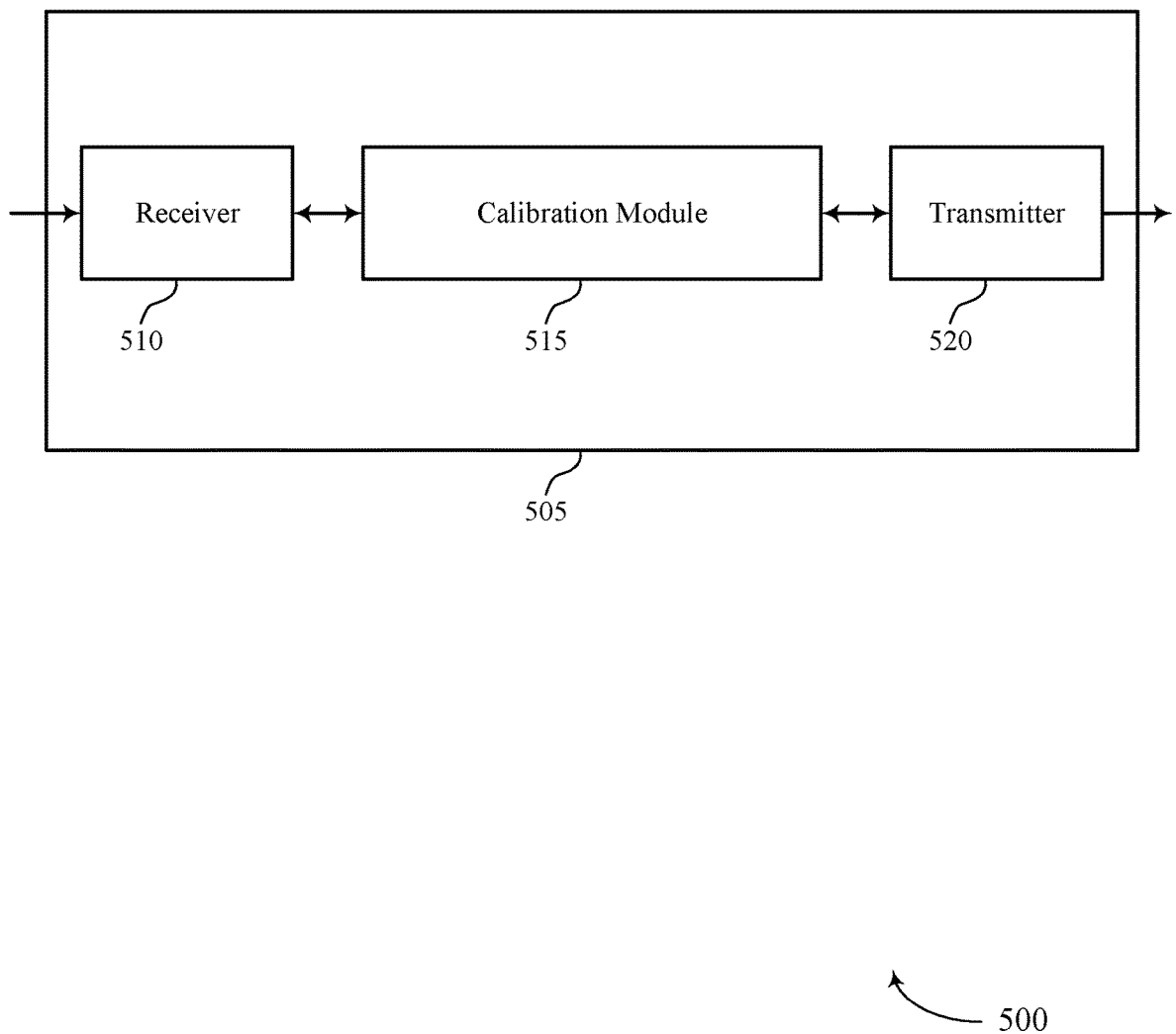
FIGS. 5 and 6 show block diagrams of devices that support determining a time gap for calibration in accordance with aspects of the present disclosure.

FIG. 5 shows a block diagram 500 of a device 505 that supports determining a time gap for calibration in accordance with aspects of the present disclosure. The device 505 may be an example of aspects of a UE 115 as described herein. The device 505 may include a receiver 510, a calibration module 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to determining a time gap for calibration, etc.). Information may be passed on to other components of the device 505. The receiver 510 may be an example of aspects of the transceiver 820 described with reference to FIG. 8. The receiver 510 may utilize a single antenna or a set of antennas.

The calibration module 515 may receive, at a UE, an indication of an identifier for the UE, determine a calibration gap based on the identifier (e.g., determine resources for a calibration gap based on the identifier), calibrate at least one antenna port of the UE (e.g., calibrate power amplification for at least one antenna port of the UE) during the determined calibration gap, and transmit, by the at least one antenna port, a signal using the calibration (e.g., using the calibrated power amplification). The calibration module 515 may be an example of aspects of the calibration module 810 described herein.

The actions performed by the calibration module 515 as described herein may be implemented to realize one or more potential advantages. One implementation may allow a UE 115 to use the identifier (e.g., an RNTI, an IMSI, or both) to determine calibration timing without incurring significant configuration latency (e.g., as compared to determining the calibration timing based on information in an RRC message). This implementation may improve the efficiency of the calibration process. Additionally or alternatively, an implementation may allow the UE 115 to use the identifier to minimize or reduce processing overhead. For example, the UE 115 may be able to save power and have increased battery life due to reduced and/or less time-constrained calibration calculations using the identifier (e.g., the RNTI, IMSI, or both), as opposed to an indication in an RRC message. Furthermore, indicating a calibration gap using a UE identifier, rather than an RRC message, may reduce RRC signaling overhead on a channel.

Based on determining resources for a calibration gap based on an identifier (e.g., an RNTI, an IMSI, or both), a processor of a UE 115 may efficiently determine calibration timing and calibrate at least one antenna port of the UE 115 with reduced configuration latency and reduced processing overhead. The processor of the UE 115 may reduce processing resources needed to determine the calibration gap timing based on the identifier. Additionally or alternatively, a transmitter of the UE 115 (e.g., transmitter 520) may improve transmission reliability and accuracy based on calibrating the at least one antenna port of the UE 115. The transmitter and/or processor may reduce power consumption and/or improve transmission reliability based on updating a transmit power using a calibrated power amplification value.

The calibration module 515, or its sub-components, may be implemented in hardware, code (e.g., software or firmware) executed by a processor, or any combination thereof. If implemented in code executed by a processor, the functions of the calibration module 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The calibration module 515, or its sub-components, may be physically located at various positions, including being distributed such that portions of functions are implemented at different physical locations by one or more physical components. In some examples, the calibration module 515, or its sub-components, may be a separate and distinct component in accordance with various aspects of the present disclosure. In some examples, the calibration module 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
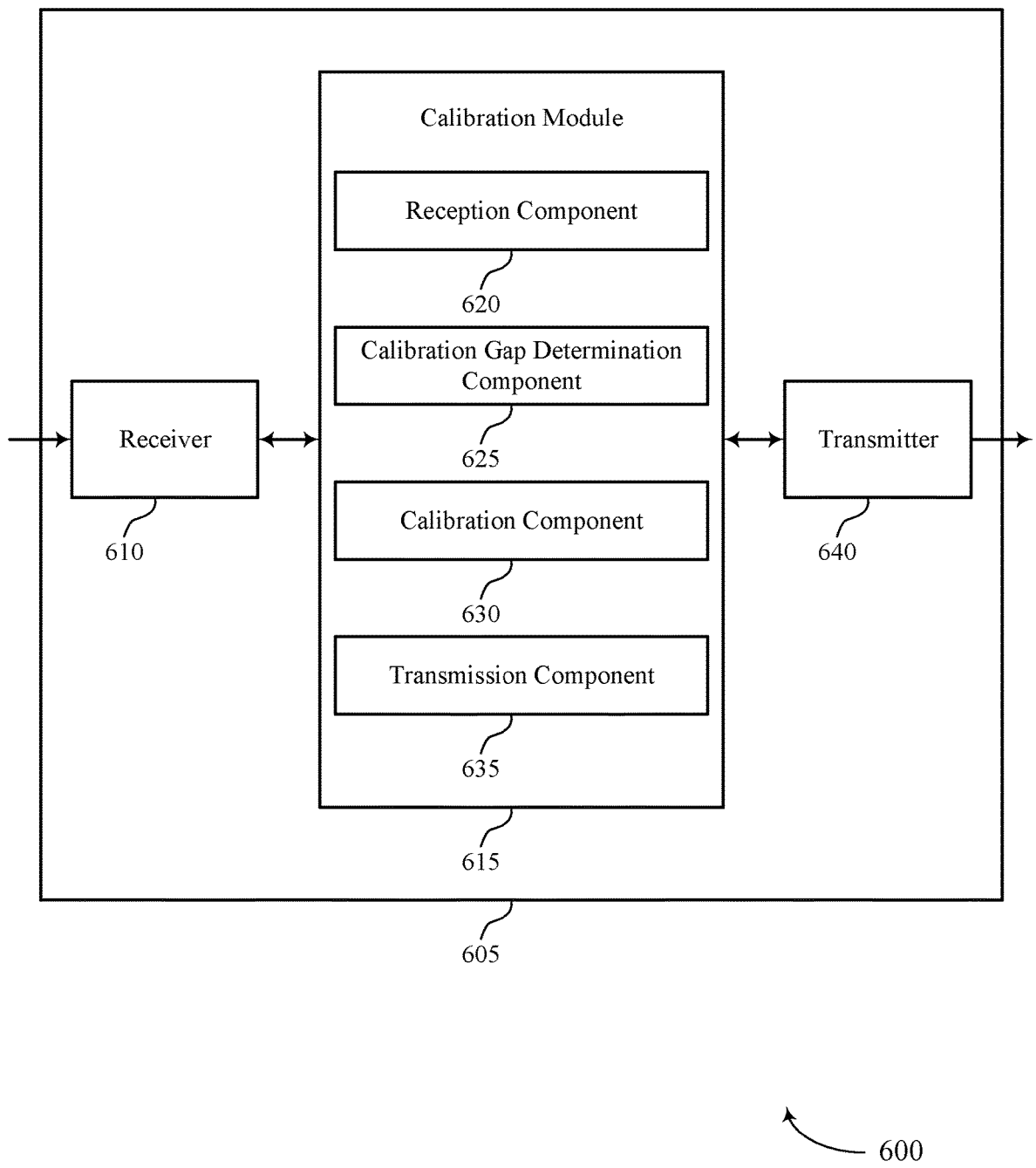

FIG. 6 shows a block diagram 600 of a device 605 that supports determining a time gap for calibration in accordance with aspects of the present disclosure. The device 605 may be an example of aspects of a device 505 or a UE 115 as described herein. The device 605 may include a receiver 610, a calibration module 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to determining a time gap for calibration, etc.). Information may be passed on to other components of the device 605. The receiver 610 may be an example of aspects of the transceiver 820 described with reference to FIG. 8. The receiver 610 may utilize a single antenna or a set of antennas.

The calibration module 615 may be an example of the calibration module 515 as described herein. The calibration module 615 may include a reception component 620, a calibration gap determination component 625, a calibration component 630, and a transmission component 635. The calibration module 615 may be an example of the calibration module 810 described herein.

The reception component 620 may receive, at a UE, an indication of an identifier for the UE. The calibration gap determination component 625 may determine a calibration gap based on the identifier (e.g., determine resources for a calibration gap).

The calibration component 630 may calibrate at least one antenna port of the UE (e.g., calibrate power amplification for at least one antenna port of the UE) during the calibration gap (e.g., the determined resources for the calibration gap). The transmission component 635 may transmit, by the at least one antenna port, a signal using the calibration (e.g., the calibrated power amplification).

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
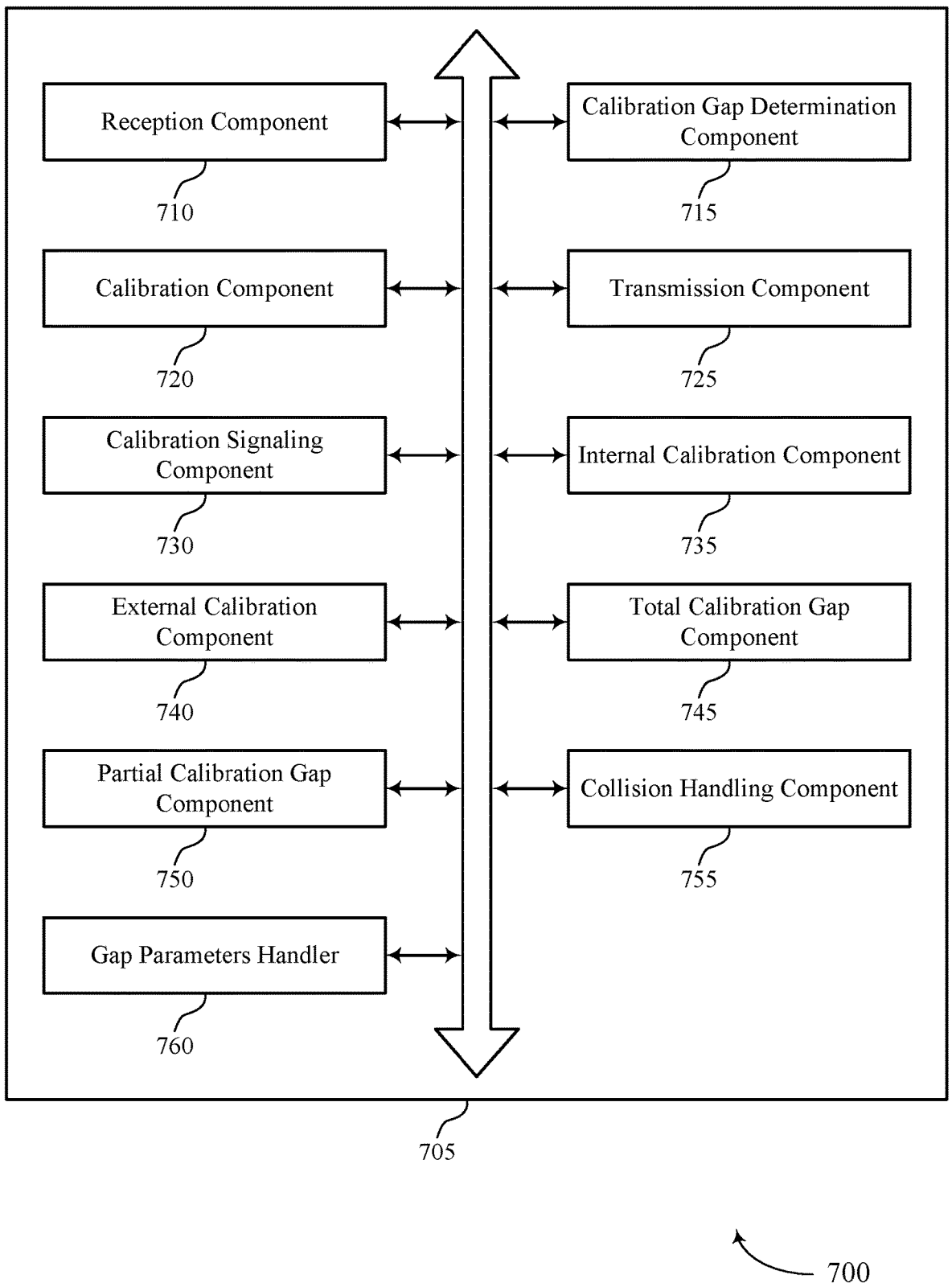
FIG. 7 shows a block diagram of a calibration module that supports determining a time gap for calibration in accordance with aspects of the present disclosure.

FIG. 7 shows a block diagram 700 of a calibration module 705 that supports determining a time gap for calibration in accordance with aspects of the present disclosure. The calibration module 705 may be an example of a calibration module 515, a calibration module 615, or a calibration module 810 described herein. The calibration module 705 may include a reception component 710, a calibration gap determination component 715, a calibration component 720, a transmission component 725, a calibration signaling component 730, an internal calibration component 735, an external calibration component 740, a total calibration gap component 745, a partial calibration gap component 750, a collision handling component 755, and a gap parameters handler 760. Each of these modules may communicate, directly or indirectly, with one another (e.g., via one or more buses).

The reception component 710 may receive, at a UE, an indication of an identifier for the UE. In some cases, the identifier may include or be an example of an RNTI for the UE. In some cases, the RNTI may be a C-RNTI. In some cases, the identifier may include or be an example of an IMSI for the UE.

The calibration gap determination component 715 may determine a calibration gap (e.g., resources for a calibration gap) based on the identifier. In some examples, determining the calibration gap may involve the calibration gap determination component 715 determining a start offset for the calibration gap, where the start offset indicates an amount of time between a reference time and a start of the calibration gap. In some cases, the reference time may be a start time of a frame with an SFN of zero. In some cases, the calibration gap may be defined by one or more of an SFN, an SFI, or a symbol location. In some cases, the calibration gap may be determined further based on one or more of a duration of the calibration gap or a periodicity of calibration gaps.

In some cases, the calibration gap may be an example of or include either a total calibration gap or a partial calibration gap. If the calibration gap is a total calibration gap, the total calibration gap component 745 may refrain from transmitting or receiving a non-calibration signal using any other antenna port of the UE during the calibration gap. If the calibration gap is a partial calibration gap, the partial calibration gap component 750 may transmit or receive a non-calibration signal using at least one other antenna port of the UE during the calibration gap. In some cases, a function for determining the total calibration gap may be different from a function for determining the partial calibration gap.

The calibration component 720 may calibrate at least one antenna port of the UE (e.g., calibrate power amplification for at least one antenna port of the UE) during the determined calibration gap.

The transmission component 725 may transmit, by the at least one antenna port, a signal using the calibration (e.g., calibrated power amplification).

In some cases, calibrating the at least one antenna port may include the calibration signaling component 730 transmitting, by the at least one antenna port, a calibration signal during the calibration gap.

In some cases, calibrating the at least one antenna port may include the internal calibration component 735 receiving, by at least one other antenna port of the UE, the calibration signal, identifying a receive power of the calibration signal received by the at least one other antenna port, estimating an actual transmit power based on the identified receive power, and adjusting the calibration for the at least one antenna port (e.g., adjusting the power amplification for the at least one antenna port) based on the estimated actual transmit power.

In some cases, calibrating the at least one antenna port may include the external calibration component 740 receiving, from another device, an indication of an estimated actual transmit power for the calibration signal and adjusting the calibration for the at least one antenna port (e.g., adjusting the power amplification for the at least one antenna port) based on the estimated actual transmit power.

The collision handling component 755 may determine an additional calibration gap based on the determined calibration gap. In some examples, the collision handling component 755 may identify a collision between the additional calibration gap and a scheduled signal. In some examples, the collision handling component 755 may refrain from calibrating the at least one antenna port (e.g., refrain from calibrating power amplification for the at least one antenna port) during the additional calibration gap based on the scheduled signal. In some cases, the scheduled signal may include an SSB signal.

The gap parameters handler 760 may determine one or more of a duration for the calibration gap or a periodicity for calibration gaps. In some examples, the gap parameters handler 760 may transmit, to a base station, an indication of the determined one or more of the duration for the calibration gap or the periodicity for the calibration gaps. In some cases, one or more of a duration of the calibration gap or a periodicity of calibration gaps are set to pre-configured values.

Figure 8:
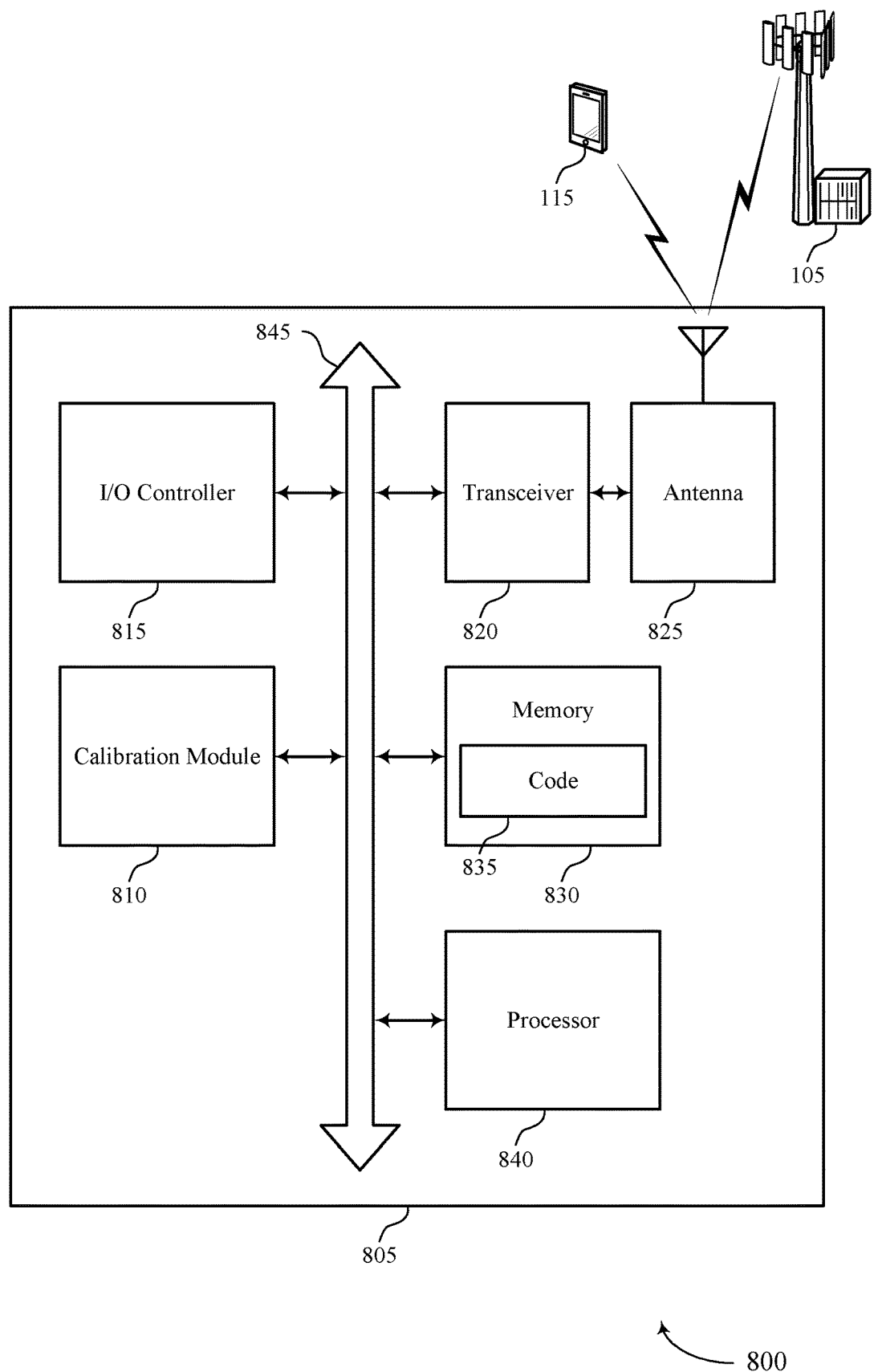
FIG. 8 shows a diagram of a system including a device that supports determining a time gap for calibration in accordance with aspects of the present disclosure.

FIG. 8 shows a diagram of a system 800 including a device 805 that supports determining a time gap for calibration in accordance with aspects of the present disclosure. The device 805 may be an example of or include the components of device 505, device 605, or a UE 115 as described herein. The device 805 may include components for bi-directional voice and data communications including components for transmitting and receiving communications, including a calibration module 810, an I/O controller 815, a transceiver 820, an antenna 825, memory 830, and a processor 840. These components may be in electronic communication via one or more buses (e.g., bus 845).

The calibration module 810 may receive, at the UE, an indication of an identifier for the UE, determine resources for a calibration gap based on the identifier, calibrate at least one antenna port of the UE (e.g., calibrate power amplification for at least one antenna port of the UE) during the determined calibration gap, and transmit, by the at least one antenna port, a signal using the calibration (e.g., using the calibrated power amplification).

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the device 805 may include a single antenna 825. However, in some cases the device 805 may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting determining a time gap for calibration).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
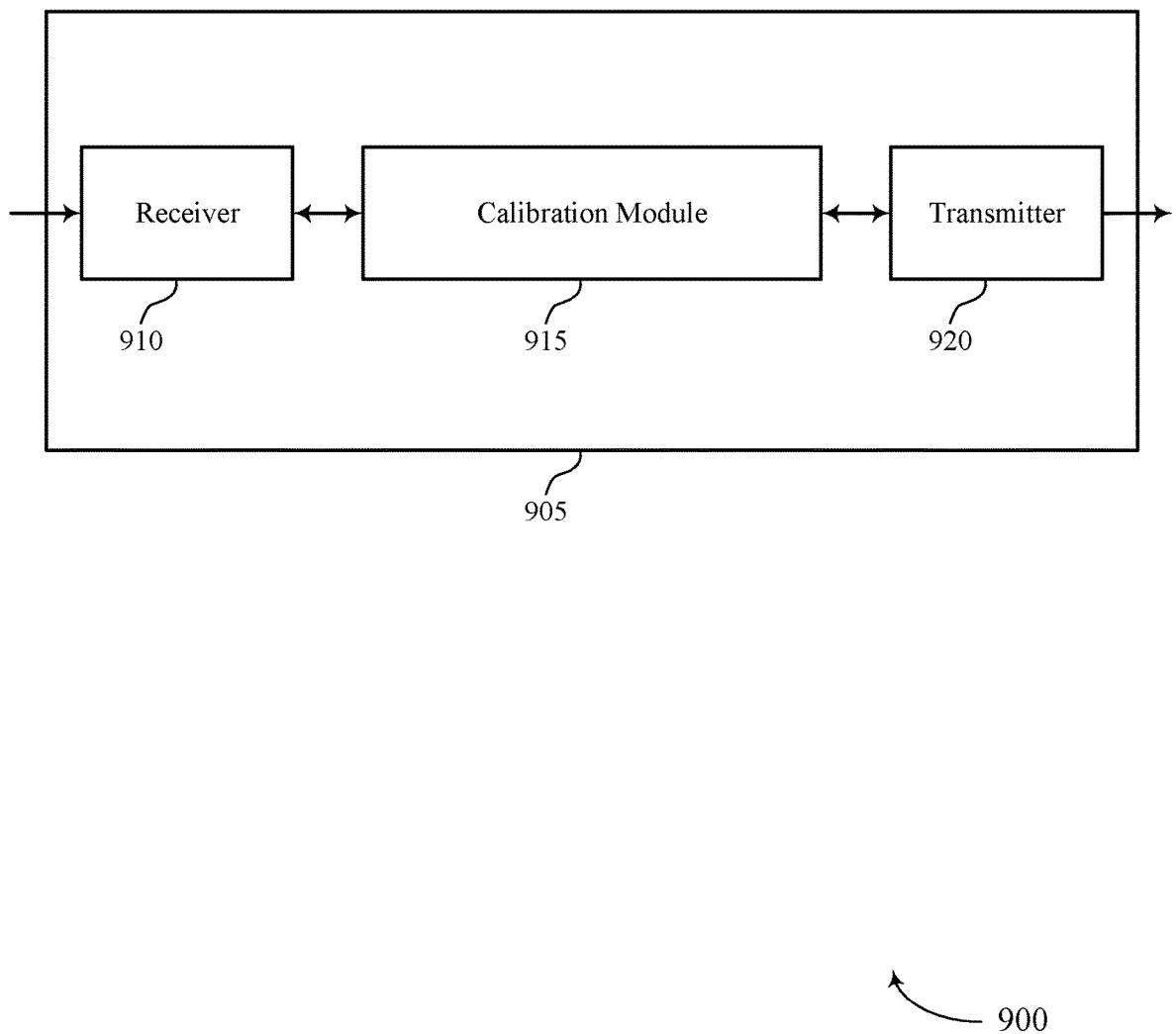
FIGS. 9 and 10 show block diagrams of devices that support determining a time gap for calibration in accordance with aspects of the present disclosure.

FIG. 9 shows a block diagram 900 of a device 905 that supports determining a time gap for calibration in accordance with aspects of the present disclosure. The device 905 may be an example of aspects of a receiving device, such as a base station 105 or a UE 115 as described herein, or any other wireless device. In some cases, the device 905 may be an example of the devices 505, 605, or 805, and may perform the functions described for any of these devices. The device 905 may include a receiver 910, a calibration module 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to determining a time gap for calibration, etc.). Information may be passed on to other components of the device 905. The receiver 910 may be an example of aspects of the transceiver 1220 described with reference to FIG. 12. The receiver 910 may utilize a single antenna or a set of antennas.

The calibration module 915 may determine a calibration gap for a UE based on an identifier for the UE, receive a calibration signal from at least one antenna port of the UE during the determined calibration gap, estimate an actual transmit power for the at least one antenna port of the UE based on a receive power of the calibration signal, and indicate, to the UE, the estimated actual transmit power. The calibration module 915 may be an example of aspects of the calibration module 1210 described herein.

The actions performed by the calibration module 915 as described herein may be implemented to realize one or more potential advantages. One implementation may allow a base station 105 or a UE 115 to use the identifier (e.g., an RNTI, an IMSI, or both) to determine calibration timing without incurring significant configuration latency (e.g., as compared to determining the calibration timing based on information in an RRC message). This implementation may improve the efficiency of the calibration process and allow the base station 105 or UE 115 to more quickly feedback transmit power information, allowing the calibrating UE to more quickly calibrate transmissions with accurate power amplification. Additionally or alternatively, an implementation may allow the base station 105 or UE 115 to use the identifier to minimize or reduce processing overhead. For example, the base station 105 or UE 115 may be able to save power and have increased battery life due to reduced and/or less time-constrained calibration calculations using the identifier (e.g., the RNTI, IMSI, or both), as opposed to an indication in an RRC message. Furthermore, determining a calibration gap using a UE identifier, rather than an RRC message, may reduce RRC signaling overhead on a channel.

Based on determining a calibration gap using an identifier (e.g., an RNTI, an IMSI, or both) for a UE 115, a processor of a base station 105 or UE 115 may efficiently determine calibration timing and provide actual transmit power feedback to the UE 115. The processor of the base station 105 or UE 115 may reduce processing resources needed to determine the calibration gap timing based on the identifier.

The calibration module 915, or its sub-components, may be implemented in hardware, code (e.g., software or firmware) executed by a processor, or any combination thereof. If implemented in code executed by a processor, the functions of the calibration module 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The calibration module 915, or its sub-components, may be physically located at various positions, including being distributed such that portions of functions are implemented at different physical locations by one or more physical components. In some examples, the calibration module 915, or its sub-components, may be a separate and distinct component in accordance with various aspects of the present disclosure. In some examples, the calibration module 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
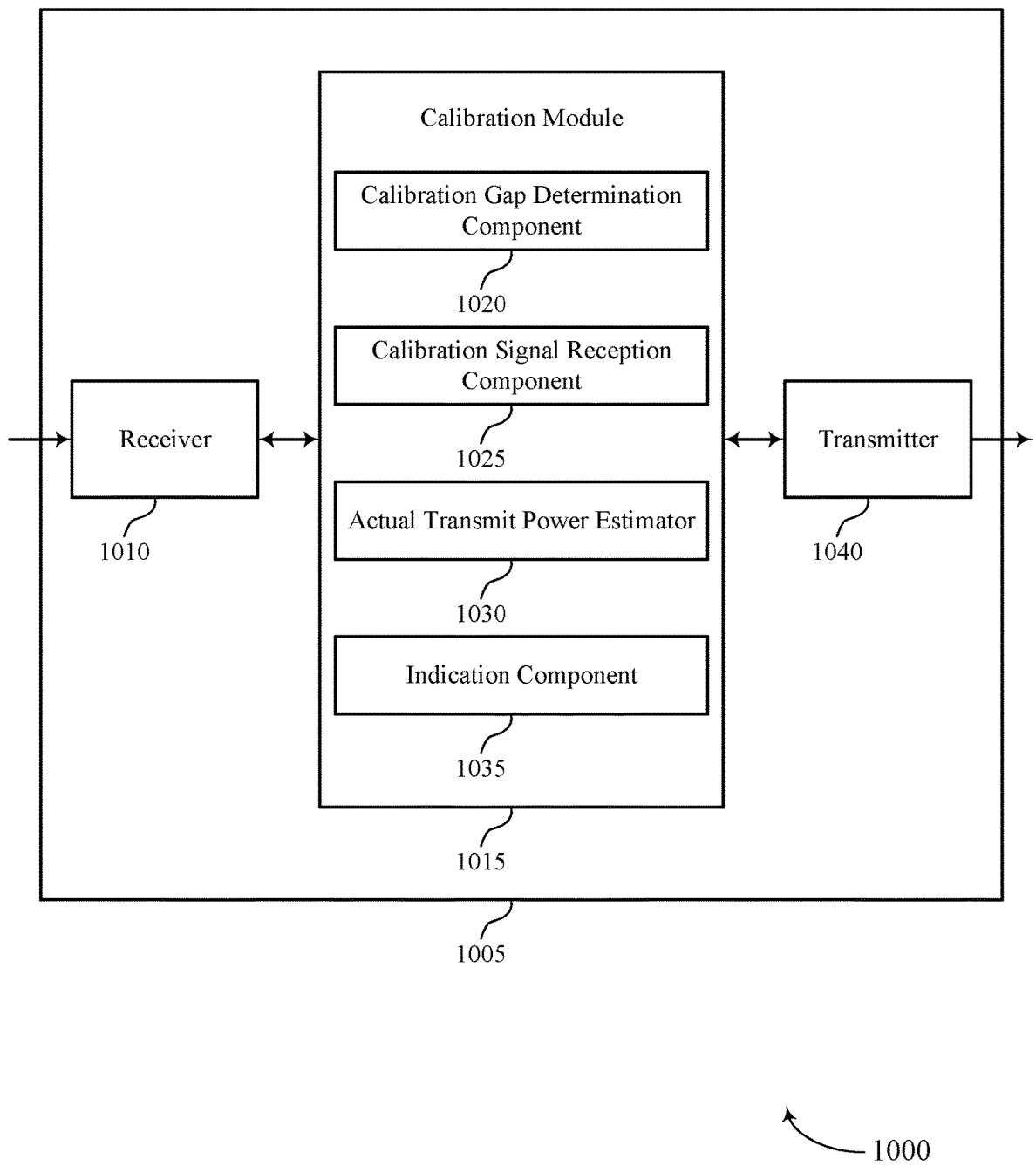

FIG. 10 shows a block diagram 1000 of a device 1005 that supports determining a time gap for calibration in accordance with aspects of the present disclosure. The device 1005 may be an example of a device 505, 605, 805, or 905, a receiving device, a UE 115, or a base station 105 as described herein. The device 1005 may include a receiver 1010, a calibration module 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to determining a time gap for calibration, etc.). Information may be passed on to other components of the device 1005. The receiver 1010 may be an example of aspects of the transceiver 1220 described with reference to FIG. 12. The receiver 1010 may utilize a single antenna or a set of antennas.

The calibration module 1015 may be an example of aspects of the calibration module 915 as described herein. The calibration module 1015 may include a calibration gap determination component 1020, a calibration signal reception component 1025, an actual transmit power estimator 1030, and an indication component 1035. The calibration module 1015 may be an example of the calibration module 1210 described herein.

The calibration gap determination component 1020 may determine a calibration gap (e.g., resources for a calibration gap) for a UE based on an identifier for the UE. The calibration signal reception component 1025 may receive a calibration signal from at least one antenna port of the UE during the determined calibration gap. The actual transmit power estimator 1030 may estimate an actual transmit power for the at least one antenna port of the UE based on a receive power of the calibration signal. The indication component 1035 may indicate, to the UE, the estimated actual transmit power.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
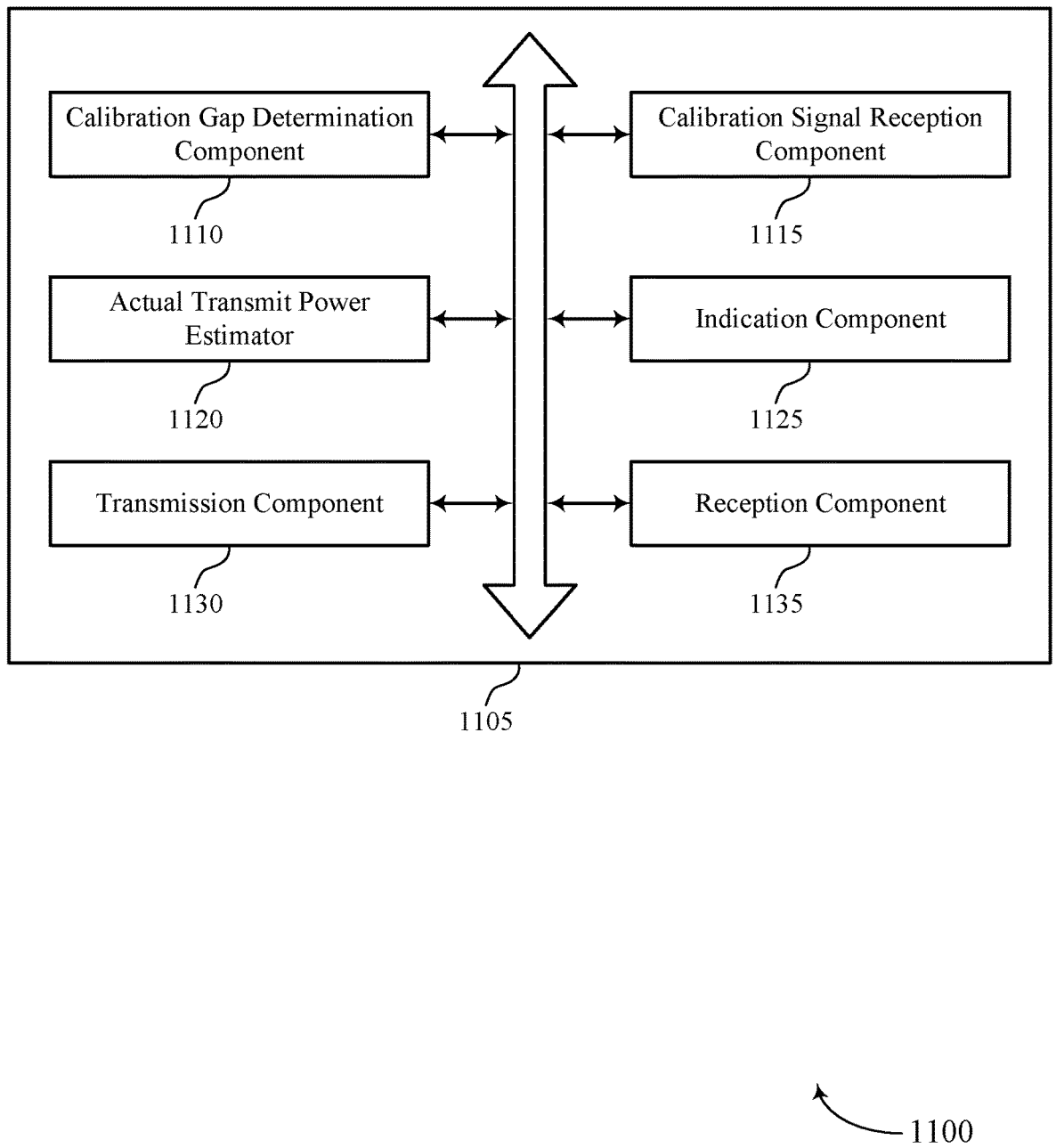
FIG. 11 shows a block diagram of a calibration module that supports determining a time gap for calibration in accordance with aspects of the present disclosure.

FIG. 11 shows a block diagram 1100 of a calibration module 1105 that supports determining a time gap for calibration in accordance with aspects of the present disclosure. The calibration module 1105 may be an example of a calibration module 915, a calibration module 1015, or a calibration module 1210 described herein. The calibration module 1105 may include a calibration gap determination component 1110, a calibration signal reception component 1115, an actual transmit power estimator 1120, an indication component 1125, a transmission component 1130, and a reception component 1135. Each of these modules may communicate, directly or indirectly, with one another (e.g., via one or more buses).

The calibration gap determination component 1110 may determine a calibration gap for a UE based on an identifier for the UE. The calibration module 1105 may be a component of a receiving device. This receiving device may be an example of a UE or base station, including the UE that the calibration gap determination component 1110 determines the calibration gap for. In some cases, the identifier may include or be an example of an RNTI for the UE. In some cases, the RNTI may be a C-RNTI.

The calibration signal reception component 1115 may receive a calibration signal from at least one antenna port of the UE during the determined calibration gap. The actual transmit power estimator 1120 may estimate an actual transmit power for the at least one antenna port of the UE based on a receive power of the calibration signal. The indication component 1125 may indicate, to the UE, the estimated actual transmit power.

In some cases, indicating the estimated actual transmit power may include the transmission component 1130 transmitting, to the UE, an indication of the estimated actual transmit power. In some examples, the transmission component 1130 may transmit, to the UE, the identifier for the UE.

The reception component 1135 may receive, from the at least one antenna port of the UE, a signal calibrated based on the estimated actual transmit power (e.g., a signal with a power amplification that is based on the estimated actual transmit power).

Figure 12:
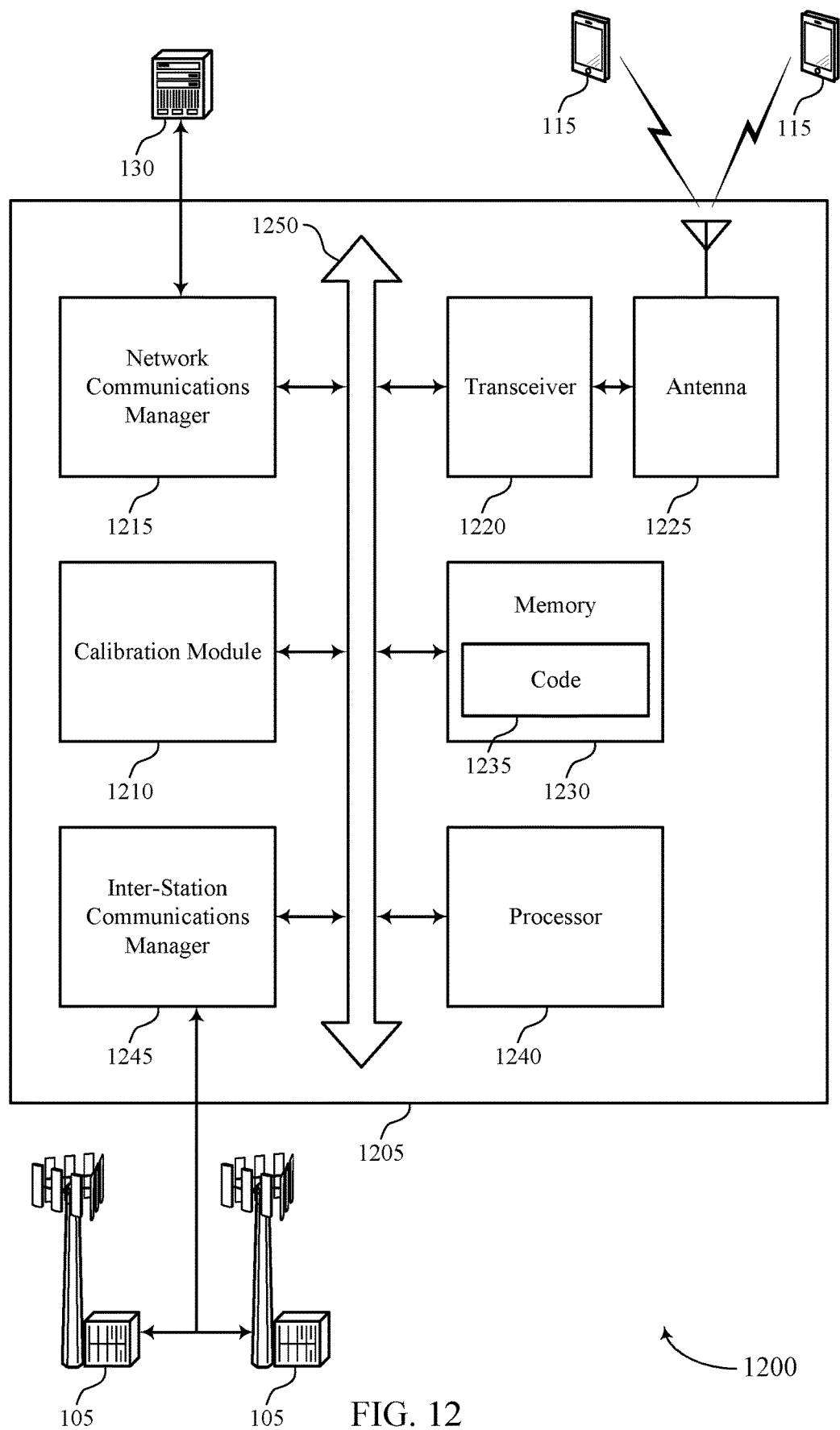
FIG. 12 shows a diagram of a system including a device that supports determining a time gap for calibration in accordance with aspects of the present disclosure.

FIG. 12 shows a diagram of a system 1200 including a device 1205 that supports determining a time gap for calibration in accordance with aspects of the present disclosure. The device 1205 may be an example of or include the components of a receiving device, such as a device 505, 605, 805, 905, 1005, or a UE 115 or base station 105 as described herein. The device 1205 may include components for bi-directional voice and data communications including components for transmitting and receiving communications, including a calibration module 1210, a network communications manager 1215, a transceiver 1220, an antenna 1225, memory 1230, a processor 1240, and an inter-station communications manager 1245. These components may be in electronic communication via one or more buses (e.g., bus 1250).

The calibration module 1210 may determine a calibration gap for a UE based on an identifier for the UE, receive a calibration signal from at least one antenna port of the UE during the determined calibration gap, estimate an actual transmit power for the at least one antenna port of the UE based on a receive power of the calibration signal, and indicate, to the UE, the estimated actual transmit power.

The network communications manager 1215 may manage communications with the core network 130 (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the device 1205 may include a single antenna 1225. However, in some cases the device 1205 may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting determining a time gap for calibration).

The inter-station communications manager 1245 may manage communications with another base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
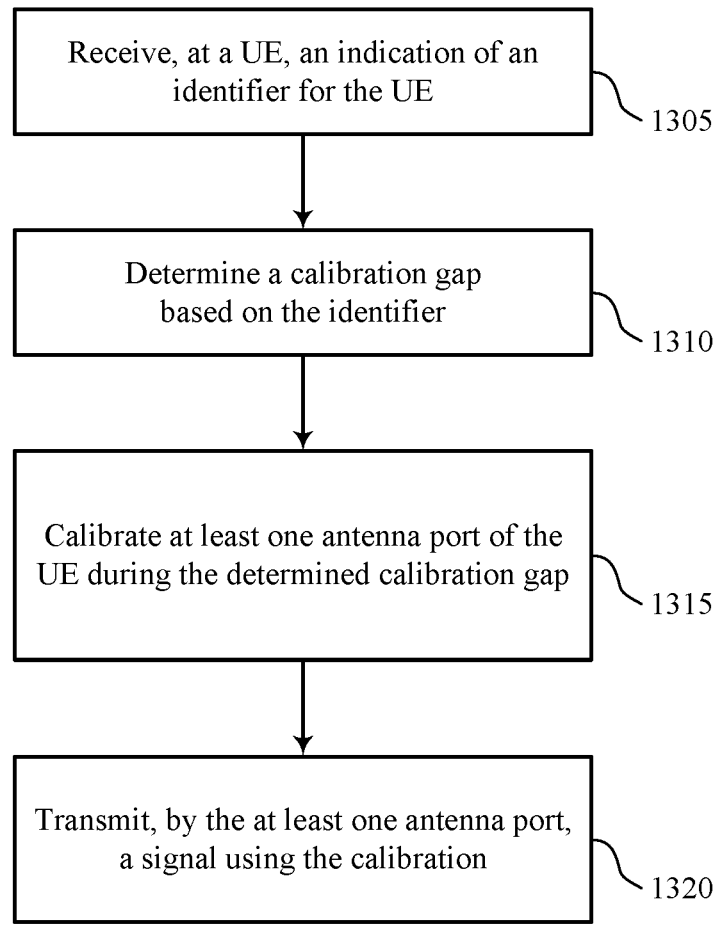
FIGS. 13 through 16 show flowcharts illustrating methods that support determining a time gap for calibration in accordance with aspects of the present disclosure.

FIG. 13 shows a flowchart illustrating a method 1300 that supports determining a time gap for calibration in accordance with aspects of the present disclosure. The operations of method 1300 may be implemented by a UE 115 or its components as described herein. For example, the operations of method 1300 may be performed by a calibration module as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive an indication of an identifier for the UE. The operations of 1305 may be performed according to the methods described herein. In some examples, aspects of the operations of 1305 may be performed by a reception component as described with reference to FIGS. 5 through 8.

At 1310, the UE may determine a calibration gap based on the identifier. For example, the UE may determine resources for the calibration gap. The operations of 1310 may be performed according to the methods described herein. In some examples, aspects of the operations of 1310 may be performed by a calibration gap determination component as described with reference to FIGS. 5 through 8.

At 1315, the UE may calibrate at least one antenna port of the UE (e.g., calibrate power amplification for at least one antenna port of the UE) during the determined calibration gap. For example, the UE may perform the calibration in the determined resources for the calibration gap. The operations of 1315 may be performed according to the methods described herein. In some examples, aspects of the operations of 1315 may be performed by a calibration component as described with reference to FIGS. 5 through 8.

At 1320, the UE may transmit, by the at least one antenna port, a signal using the calibration (e.g., the calibrated power amplification). The operations of 1320 may be performed according to the methods described herein. In some examples, aspects of the operations of 1320 may be performed by a transmission component as described with reference to FIGS. 5 through 8.

Figure 14:
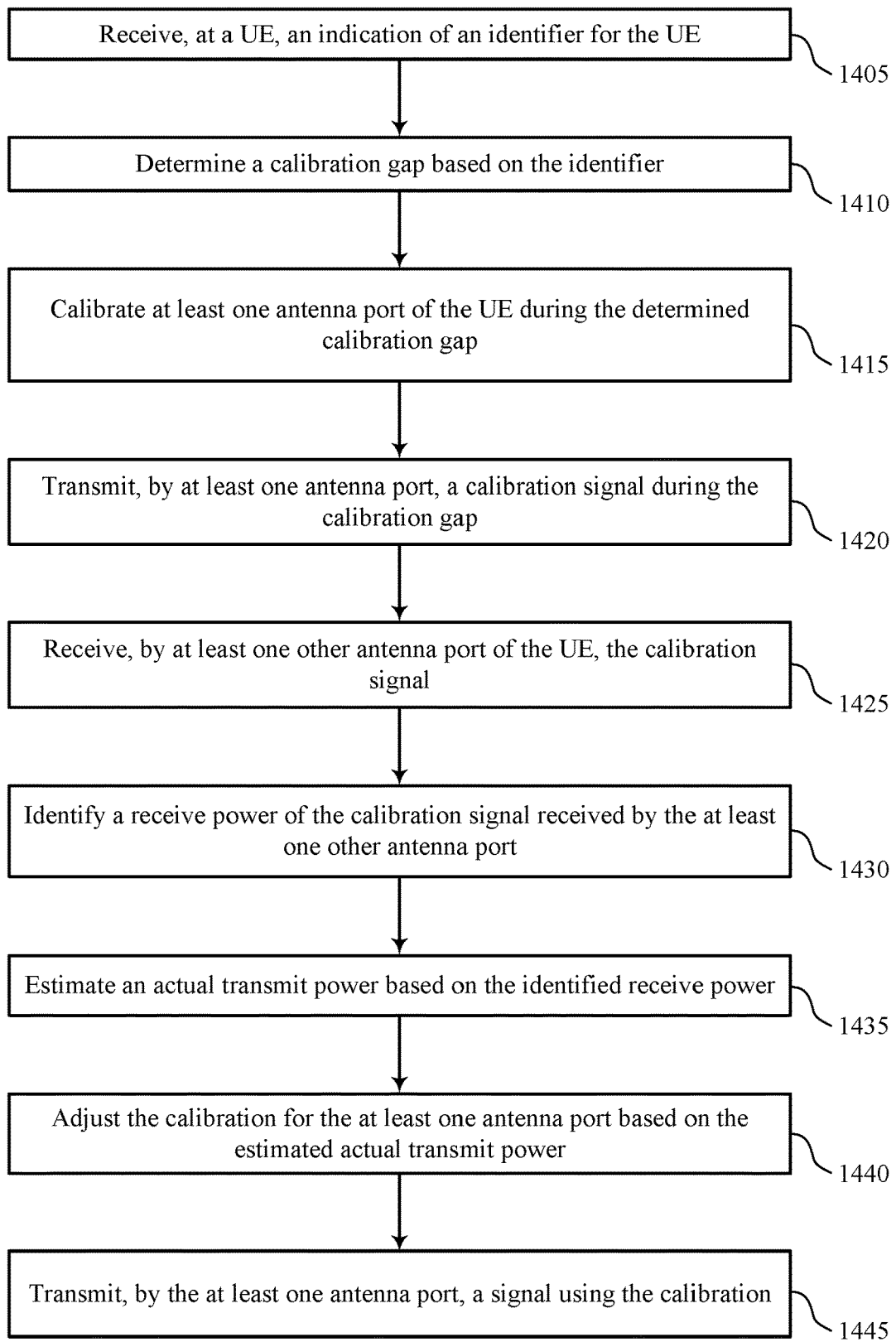

FIG. 14 shows a flowchart illustrating a method 1400 that supports determining a time gap for calibration in accordance with aspects of the present disclosure. The operations of method 1400 may be implemented by a UE 115 or its components as described herein. For example, the operations of method 1400 may be performed by a calibration module as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive an indication of an identifier for the UE. The operations of 1405 may be performed according to the methods described herein. In some examples, aspects of the operations of 1405 may be performed by a reception component as described with reference to FIGS. 5 through 8.

At 1410, the UE may determine a calibration gap based on the identifier. The operations of 1410 may be performed according to the methods described herein. In some examples, aspects of the operations of 1410 may be performed by a calibration gap determination component as described with reference to FIGS. 5 through 8.

At 1415, the UE may calibrate at least one antenna port of the UE (e.g., calibrate power amplification for at least one antenna port of the UE) during the determined calibration gap. The operations of 1415 may be performed according to the methods described herein. In some examples, aspects of the operations of 1415 may be performed by a calibration component as described with reference to FIGS. 5 through 8.

At 1420, the UE may transmit, by the at least one antenna port, a calibration signal during the calibration gap. The operations of 1420 may be performed according to the methods described herein. In some examples, aspects of the operations of 1420 may be performed by a calibration signaling component as described with reference to FIGS. 5 through 8.

At 1425, the UE may receive, by at least one other antenna port of the UE, the calibration signal. The operations of 1425 may be performed according to the methods described herein. In some examples, aspects of the operations of 1425 may be performed by an internal calibration component as described with reference to FIGS. 5 through 8.

At 1430, the UE may identify a receive power of the calibration signal received by the at least one other antenna port. The operations of 1430 may be performed according to the methods described herein. In some examples, aspects of the operations of 1430 may be performed by an internal calibration component as described with reference to FIGS. 5 through 8.

At 1435, the UE may estimate an actual transmit power based on the identified receive power. The operations of 1435 may be performed according to the methods described herein. In some examples, aspects of the operations of 1435 may be performed by an internal calibration component as described with reference to FIGS. 5 through 8.

At 1440, the UE may adjust the calibration for the at least one antenna port (e.g., adjust the power amplification for the at least one antenna port) based on the estimated actual transmit power. The operations of 1440 may be performed according to the methods described herein. In some examples, aspects of the operations of 1440 may be performed by an internal calibration component as described with reference to FIGS. 5 through 8.

At 1445, the UE may transmit, by the at least one antenna port, a signal using the calibration (e.g., using the calibrated power amplification). The operations of 1445 may be performed according to the methods described herein. In some examples, aspects of the operations of 1445 may be performed by a transmission component as described with reference to FIGS. 5 through 8.

Figure 15:
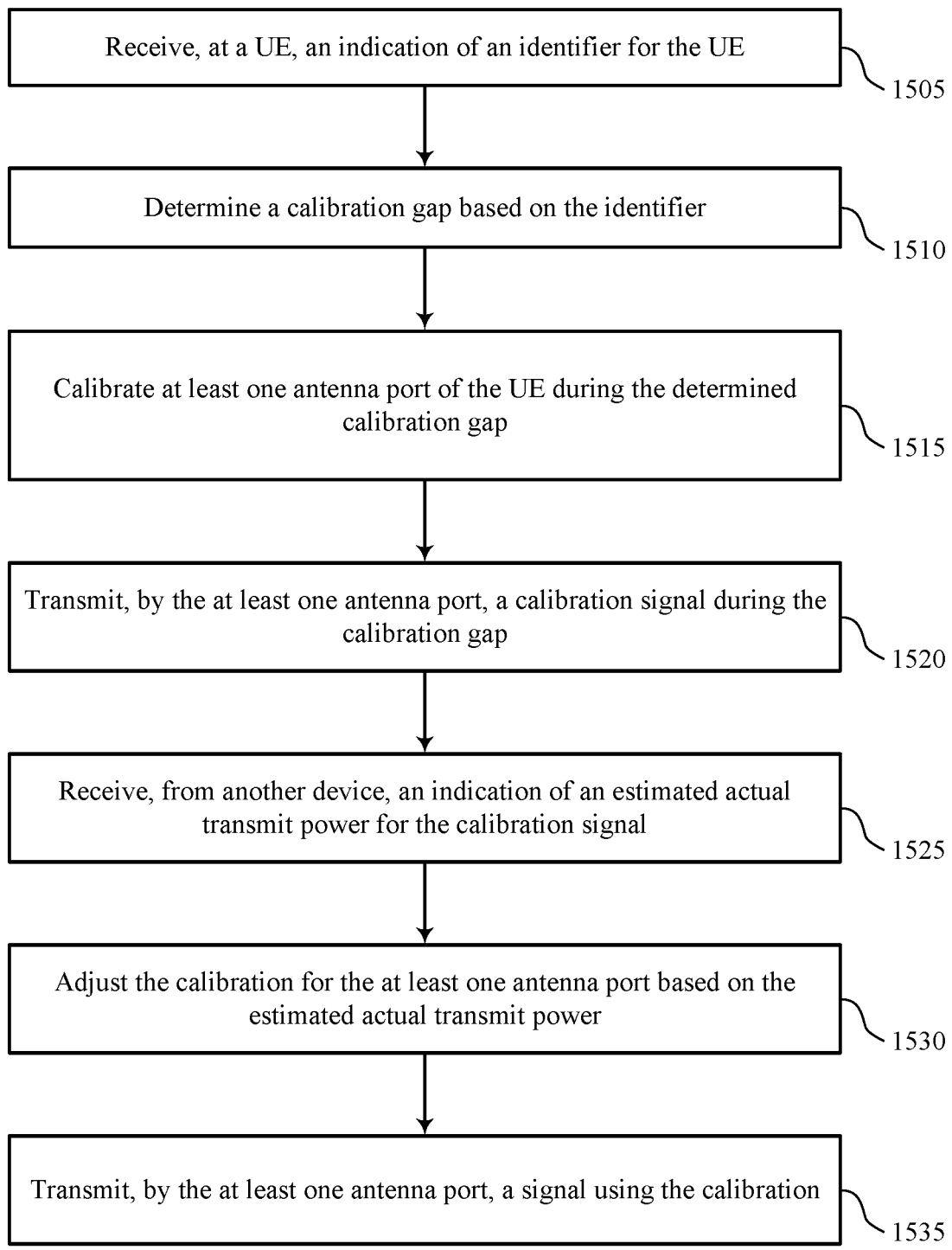

FIG. 15 shows a flowchart illustrating a method 1500 that supports determining a time gap for calibration in accordance with aspects of the present disclosure. The operations of method 1500 may be implemented by a UE 115 or its components as described herein. For example, the operations of method 1500 may be performed by a calibration module as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may receive an indication of an identifier for the UE. The operations of 1505 may be performed according to the methods described herein. In some examples, aspects of the operations of 1505 may be performed by a reception component as described with reference to FIGS. 5 through 8.

At 1510, the UE may determine a calibration gap based on the identifier. The operations of 1510 may be performed according to the methods described herein. In some examples, aspects of the operations of 1510 may be performed by a calibration gap determination component as described with reference to FIGS. 5 through 8.

At 1515, the UE may calibrate at least one antenna port of the UE (e.g., calibrate power amplification for at least one antenna port of the UE) during the determined calibration gap. The operations of 1515 may be performed according to the methods described herein. In some examples, aspects of the operations of 1515 may be performed by a calibration component as described with reference to FIGS. 5 through 8.

At 1520, the UE may transmit, by the at least one antenna port, a calibration signal during the calibration gap. The operations of 1520 may be performed according to the methods described herein. In some examples, aspects of the operations of 1520 may be performed by a calibration signaling component as described with reference to FIGS. 5 through 8.

At 1525, the UE may receive, from another device, an indication of an estimated actual transmit power for the calibration signal. The operations of 1525 may be performed according to the methods described herein. In some examples, aspects of the operations of 1525 may be performed by an external calibration component as described with reference to FIGS. 5 through 8.

At 1530, the UE may adjust the calibration for the at least one antenna port (e.g., adjust the power amplification for the at least one antenna port) based on the estimated actual transmit power. The operations of 1530 may be performed according to the methods described herein. In some examples, aspects of the operations of 1530 may be performed by an external calibration component as described with reference to FIGS. 5 through 8.

At 1535, the UE may transmit, by the at least one antenna port, a signal using the calibration (e.g., using the calibrated power amplification). The operations of 1535 may be performed according to the methods described herein. In some examples, aspects of the operations of 1535 may be performed by a transmission component as described with reference to FIGS. 5 through 8.

Figure 16:
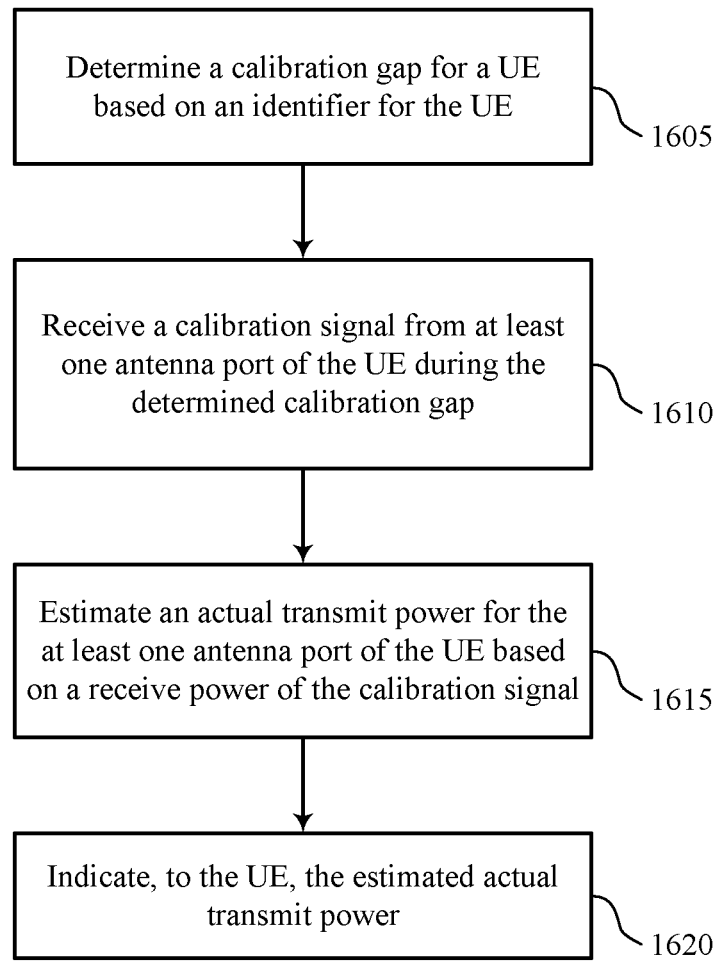

FIG. 16 shows a flowchart illustrating a method 1600 that supports determining a time gap for calibration in accordance with aspects of the present disclosure. The operations of method 1600 may be implemented by a receiving device, such as a base station 105, a UE 115, any other wireless device, or its components as described herein. For example, the operations of method 1600 may be performed by a calibration module as described with reference to FIGS. 9 through 12. In some examples, a receiving device may execute a set of instructions to control the functional elements of the receiving device to perform the functions described herein. Additionally or alternatively, a receiving device may perform aspects of the functions described herein using special-purpose hardware.

At 1605, the receiving device may determine a calibration gap for a UE based on an identifier for the UE. The operations of 1605 may be performed according to the methods described herein. In some examples, aspects of the operations of 1605 may be performed by a calibration gap determination component as described with reference to FIGS. 9 through 12.

At 1610, the receiving device may receive a calibration signal from at least one antenna port of the UE during the determined calibration gap. The operations of 1610 may be performed according to the methods described herein. In some examples, aspects of the operations of 1610 may be performed by a calibration signal reception component as described with reference to FIGS. 9 through 12.

At 1615, the receiving device may estimate an actual transmit power for the at least one antenna port of the UE based on a receive power of the calibration signal. The operations of 1615 may be performed according to the methods described herein. In some examples, aspects of the operations of 1615 may be performed by an actual transmit power estimator as described with reference to FIGS. 9 through 12.

At 1620, the receiving device may indicate, to the UE, the estimated actual transmit power. The operations of 1620 may be performed according to the methods described herein. In some examples, aspects of the operations of 1620 may be performed by an indication component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Described below are a number of examples of methods, systems or apparatuses including means for implementing methods or realizing apparatuses, non-transitory computer-readable medium storing instructions executable by one or more processors to cause the one or more processors to implement methods, and systems including one or more processors and memory in electronic communication with the one or more processors storing instructions executable by the one or more processors to cause the system or apparatus to implement methods. It is to be understood that these are just some examples of possible implementations, and other examples will be readily apparent to those skilled in the art without departing from the scope of the disclosure.

Example 1 is a method for wireless communications at a UE that includes receiving, at the UE, an indication of an identifier for the UE, determining resources for a calibration gap based on the identifier, calibrating at least one antenna port of the UE during the calibration gap, and transmitting, by the at least one antenna port, a signal using the calibration. In some cases, the calibration gap of Example 1 may be a PA calibration gap and calibrating the at least one antenna port of the UE may involve calibrating power amplification for the at least one antenna port.

In Example 2, the identifier of Example 1 is an RNTI for the UE.

In Example 3, the RNTI of Example 2 is a C-RNTI.

In Example 4, the determining the calibration gap of any of Examples 1-3 further includes determining a start offset for the calibration gap, where the start offset indicates an amount of time between a reference time and a start of the calibration gap.

In Example 5, the reference time of Example 4 may be a start time of a frame with an SFN of zero.

In Example 6, the calibration gap of any of Examples 1-5 may be defined by one or more of an SFN, an SFI, or a symbol location.

In Example 7, the calibrating the at least one antenna port of any of Examples 1-6 further includes transmitting, by the at least one antenna port, a calibration signal during the calibration gap.

In Example 8, the calibrating the at least one antenna port of Example 7 further includes receiving, by at least one other antenna port of the UE, the calibration signal, identifying a receive power of the calibration signal received by the at least one other antenna port, estimating an actual transmit power based on the identified receive power and adjusting the calibration for the at least one antenna port (e.g., adjusting the power amplification for the at least one antenna port) based on the estimated actual transmit power.

In Example 9, the calibrating the at least one antenna port of either of Examples 7 or 8 further includes receiving, from another device, an indication of an estimated actual transmit power for the calibration signal and adjusting the calibration for the at least one antenna port (e.g., adjusting the power amplification for the at least one antenna port) based on the estimated actual transmit power.

In Example 10, the calibration gap of any of Examples 1-9 includes either a total calibration gap or a partial calibration gap.

In Example 11, the calibration gap of Example 10 is an example of the total calibration gap, the method of Example 10 further including refraining from transmitting or receiving a non-calibration signal using any other antenna port of the UE during the calibration gap.

In Example 12, the calibration gap of Example 10 is an example of the partial calibration gap, the method of Example 10 further including transmitting or receiving a non-calibration signal using at least one other antenna port of the UE during the calibration gap.

In Example 13, the method of any of Examples 10-12 further includes where a function for determining the total calibration gap may be different from a function for determining the partial calibration gap.

In Example 14, the method of any of Examples 1-13 further includes determining an additional calibration gap based on the determined calibration gap, identifying a collision between the additional calibration gap and a scheduled signal, and refraining from calibrating the at least one antenna port (e.g., refraining from calibrating power amplification for the at least one antenna port) during the additional calibration gap based on the scheduled signal.

In Example 15, the scheduled signal of Example 14 is an SSB signal.

In Example 16, the method of any of Examples 1-15 further includes determining one or more of a duration for the calibration gap or a periodicity for calibration gaps and transmitting, to a base station, an indication of the determined one or more of the duration for the calibration gap or the periodicity for the calibration gaps.

In Example 17, the calibration gap of any of Examples 1-16 may be determined further based on one or more of a duration of the calibration gap or a periodicity of calibration gaps.

In Example 18, the identifier of any of Examples 1-17 is an example of an IMSI for the UE.

In Example 19, one or more of a duration of the calibration gap or a periodicity of calibration gaps for any of Examples 1-18 may be set to pre-configured values.

Example 20 is a system or apparatus including means for implementing a method or realizing an apparatus as in any of examples 1-19.

Example 21 is a system including one or more processors and memory in electronic communication with the one or more processors storing instructions executable by the one or more processors to cause the system or apparatus to implement a method as in any of examples 1-19.

Example 22 is a non-transitory computer-readable medium storing instructions executable by one or more processors to cause the one or more processors to implement a method as in any of examples 1-19.

Example 23 is a method for wireless communications at a receiving device that includes determining a calibration gap for a UE based on an identifier for the UE, receiving a calibration signal from at least one antenna port of the UE during the determined calibration gap, estimating an actual transmit power for the at least one antenna port of the UE based on a receive power of the calibration signal, and indicating, to the UE, the estimated actual transmit power. In some cases, the calibration gap of Example 23 is a PA calibration gap.

In Example 24, the identifier of Example 23 is an RNTI for the UE.

In Example 25, the RNTI of Example 24 is a C-RNTI.

In Example 26, the indicating the estimated actual transmit power of any of Examples 23-25 further includes transmitting, to the UE, an indication of the estimated actual transmit power.

In Example 27, the method of any of Examples 23-26 further includes receiving, from the at least one antenna port of the UE, a signal calibrated based on the estimated actual transmit power (e.g., a signal with a power amplification that may be based on the estimated actual transmit power).

In Example 28, the method of any of Examples 23-27 further includes transmitting, to the UE, the identifier for the UE.

In Example 29, the receiving device of any of Examples 23-28 is the UE, a different UE, or a base station.

Example 30 is a system or apparatus including means for implementing a method or realizing an apparatus as in any of examples 23-29.

Example 31 is a system including one or more processors and memory in electronic communication with the one or more processors storing instructions executable by the one or more processors to cause the system or apparatus to implement a method as in any of examples 23-29.

Example 32 is a non-transitory computer-readable medium storing instructions executable by one or more processors to cause the one or more processors to implement a method as in any of examples 23-29.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, at the UE, an indication of a radio network temporary identifier (RNTI) for the UE;
   transmitting, by at least one antenna port, a calibration signal corresponding to the at least one antenna port during an antenna port calibration gap, the antenna port calibration gap based at least in part on the RNTI for the UE;
   calibrating the at least one antenna port of the UE during the antenna port calibration gap based at least in part on the calibration signal corresponding to the at least one antenna port; and
   transmitting, by the at least one antenna port, a signal based at least in part on the calibrating the at least one antenna port.

2. The method of claim 1, wherein:
   the antenna port calibration gap comprises a power amplifier (PA) calibration gap;
   the calibrating the at least one antenna port of the UE comprises calibrating power amplification for the at least one antenna port; and
   the transmitting the signal comprises transmitting, by the at least one antenna port, the signal using the calibrated power amplification based at least in part on the calibrating the power amplification for the at least one antenna port.

3. The method of claim 1, wherein the RNTI comprises a cell RNTI (C-RNTI).

4. The method of claim 1, further comprising:
   determining a start offset for the antenna port calibration gap, wherein the start offset indicates an amount of time between a reference time and a start of the antenna port calibration gap.

5. The method of claim 4, wherein the reference time is a start time of a frame with a system frame number of zero.

6. The method of claim 1, wherein the antenna port calibration gap is defined by one or more of a system frame number, a subframe index, or a symbol location.

7. The method of claim 1, wherein calibrating the at least one antenna port further comprises:
   receiving, by at least one other antenna port of the UE, the calibration signal;
   identifying a receive power of the calibration signal received by the at least one other antenna port;
   estimating an actual transmit power based at least in part on the identified receive power; and
   adjusting a power amplifier (PA) calibration for the at least one antenna port based at least in part on the estimated actual transmit power.

8. The method of claim 1, wherein calibrating the at least one antenna port further comprises:
   receiving, from another device, an indication of an estimated actual transmit power for the calibration signal; and
   adjusting a power amplifier (PA) calibration for the at least one antenna port based at least in part on the estimated actual transmit power.

9. The method of claim 1, wherein the antenna port calibration gap comprises either a total antenna port calibration gap or a partial antenna port calibration gap.

10. The method of claim 9, wherein the antenna port calibration gap comprises the total antenna port calibration gap, the method further comprising:
    refraining from transmitting or receiving a non-calibration signal using any other antenna port of the UE during the antenna port calibration gap.

11. The method of claim 9, wherein the antenna port calibration gap comprises the partial antenna port calibration gap, the method further comprising:
    transmitting or receiving a non-calibration signal using at least one other antenna port of the UE during the antenna port calibration gap.

12. The method of claim 1, further comprising:
    determining an additional antenna port calibration gap based at least in part on the RNTI for the UE;
    identifying a collision between the additional antenna port calibration gap and a scheduled signal; and
    refraining from calibrating the at least one antenna port during the additional antenna port calibration gap based at least in part on the scheduled signal.

13. The method of claim 12, wherein the scheduled signal comprises a synchronization signal block (SSB) signal.

14. The method of claim 1, further comprising:
    determining one or more of a duration for the antenna port calibration gap or a periodicity for antenna port calibration gaps; and
    transmitting, to a network device, an indication of the determined one or more of the duration for the antenna port calibration gap or the periodicity for the antenna port calibration gaps.

15. The method of claim 1, wherein:
    the antenna port calibration gap is determined further based at least in part on one or more of a duration of the antenna port calibration gap or a periodicity of antenna port calibration gaps; and
    one or more of the duration of the antenna port calibration gap or the periodicity of the antenna port calibration gaps are set to pre-configured values.

16. A method for wireless communications at a receiving device, comprising:
- receiving a calibration signal from at least one antenna port of a user equipment (UE) during an antenna port calibration gap, the calibration signal corresponding to the at least one antenna port, and the antenna port calibration gap based at least in part on a radio network temporary identifier (RNTI) for the UE;
- estimating an actual transmit power for the at least one antenna port of the UE based at least in part on a receive power of the calibration signal corresponding to the at least one antenna port; and
- indicating, to the UE, the estimated actual transmit power.

17. The method of claim 16, wherein the antenna port calibration gap comprises a power amplifier (PA) calibration gap.

18. The method of claim 16, wherein the RNTI comprises a cell RNTI (C-RNTI).

19. The method of claim 16, wherein indicating the estimated actual transmit power comprises:
- transmitting, to the UE, an indication of the estimated actual transmit power.

20. The method of claim 16, further comprising:
- receiving, from the at least one antenna port of the UE, a signal calibrated based at least in part on the estimated actual transmit power.

21. The method of claim 16, further comprising:
- transmitting, to the UE, the RNTI for the UE.

22. The method of claim 16, wherein the receiving device comprises the UE, a different UE, or a network device.

23. An apparatus for wireless communications at a user equipment (UE), comprising:
- a processor;
- memory coupled with the processor; and
- instructions stored in the memory and executable by the processor to cause the apparatus to:
  - receive, at the UE, an indication of a radio network temporary identifier (RNTI) for the UE;
  - transmit, by at least one antenna port, a calibration signal corresponding to the at least one antenna port during an antenna port calibration gap, the antenna port calibration gap based at least in part on the RNTI for the UE;
  - calibrate the at least one antenna port of the UE during the antenna port calibration gap based at least in part on the calibration signal corresponding to the at least one antenna port; and
  - transmit, by the at least one antenna port, a signal based at least in part on the calibrating the at least one antenna port.

24. The apparatus of claim 23, wherein:
- the antenna port calibration gap comprises a power amplifier (PA) calibration gap;
- the calibrating the at least one antenna port of the UE comprises calibrating power amplification for the at least one antenna port; and
- the transmitting the signal comprises transmitting, by the at least one antenna port, the signal using the calibrated power amplification based at least in part on the calibrating the power amplification for the at least one antenna port.

25. An apparatus for wireless communications at a receiving device, comprising:
- a processor;
- memory coupled with the processor; and
- instructions stored in the memory and executable by the processor to cause the apparatus to:
  - receive a calibration signal from at least one antenna port of a user equipment (UE) during an antenna port calibration gap, the calibration signal corresponding to the at least one antenna port, and the antenna port calibration gap based at least in part on a radio network temporary identifier (RNTI) for the UE;
  - estimate an actual transmit power for the at least one antenna port of the UE based at least in part on a receive power of the calibration signal corresponding to the at least one antenna port; and
  - indicate, to the UE, the estimated actual transmit power.

26. The apparatus of claim 25, wherein the antenna port calibration gap comprises a power amplifier (PA) calibration gap.

* * * * *